(12) United States Patent
Kunimoto et al.

(10) Patent No.: US 6,258,954 B1
(45) Date of Patent: Jul. 10, 2001

(54) FLUORESCENT MALEIMIDES AND USES THEREOF

(75) Inventors: Kazuhiko Kunimoto, Takatsuki; Junji Otani, Kobe; Kunihiko Kodama, Chitose; Hiroshi Yamamoto, Takarazuka, all of (JP); Patrick Verhoustraeten, Lörrach (DE); Sonia Megert, Ueken (CH); Adalbert Braig, Binzen (DE)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 0 days.

(21) Appl. No.: 09/643,594

(22) Filed: Aug. 22, 2000

(30) Foreign Application Priority Data

Sep. 16, 1999 (EP) .................................................. 99810826

(51) Int. Cl.⁷ ...................... C07D 207/20; C07D 409/10; C07D 471/06
(52) U.S. Cl. ........................... 546/36; 546/256; 548/524; 548/526; 548/444; 548/549
(58) Field of Search ..................................... 548/549, 526, 548/524, 444, 527; 546/36, 256

(56) References Cited

U.S. PATENT DOCUMENTS

| 3,808,434 | 4/1974 | Gutbier ................................ 250/302 |
| 4,596,867 | 6/1986 | Fields et al. ......................... 534/799 |
| 4,985,568 | * | 1/1991 | Lubowitz et al. .................... 548/431 |
| 5,151,487 | * | 9/1992 | Lubowitz et al. .................... 528/170 |
| 5,496,920 | 3/1996 | Pfaendner et al. .................... 528/487 |

FOREIGN PATENT DOCUMENTS 0 456 609 11/1991 (EP) .
0 628 588 12/1994 (EP) .

OTHER PUBLICATIONS

Patent Abstracts of Japan #08231502 (Sep. 1996).
Patent Abstracts of Japan #08320582 (Dec. 1996),.
Patent Abstracts of Japan #09090442 (Apr. 1997).
Chem. Abst. JP–A2–50123664, (1974).
Tetrahedron vol. 51, No. 36 (1995) pp. 9941–9946.
Chem Pharm Bull. vol. 28 (7) (1980) pp. 2178–2184.
Chem Pharm Bull. vol. 37 (1989) pp. 2710–2712
J. Org. Chem. vol. 42, No. 17, (1977) pp. 2819–2825.
Appl. Phys. Lett. vol. 51 (12) 1987 pp. 913–915.
German Language publication pp. 2478–2486.

* cited by examiner

Primary Examiner—Joseph K. McKane
Assistant Examiner—Sonya N. Wright
(74) Attorney, Agent, or Firm—David R. Crichton

(57) ABSTRACT

The present invention relates to compounds of formula I

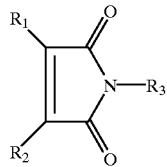

provided that $R_1$ and $R_2$ not simultaneously stand for phenyl, the use thereof in, for example, electroluminescent devices and as void detection compounds.

3 Claims, No Drawings

FLUORESCENT MALEIMIDES AND USES THEREOF

The present invention relates to fluorescent maleimides of the formula I

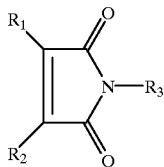

wherein $R_1$ and $R_2$ independently from each other stand for

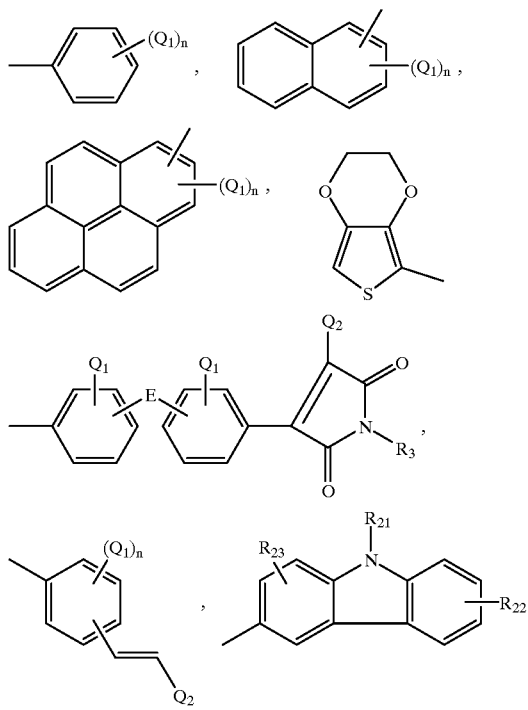

wherein $Q_1$ stands for hydrogen, halogen, phenyl, —E—$C_1$–$C_8$alkyl, —E-phenyl, wherein phenyl can be substituted up to three times with $C_1$–$C_8$alkyl, halogen, $C_1$–$C_8$alkoxy, diphenylamino, —CH=CH—$Q_2$, wherein $Q_2$ stands for phenyl, pyridyl, or thiophenyl, which can be substituted up to three times with $C_1$–$C_8$alkyl, halogen, $C_1$–$C_8$alkoxy, —CN, wherein E stands for oxygen or sulfur, and wherein $R_{21}$ stands for $C_1$–$C_8$alkyl, phenyl, which can be substituted up to three times with $C_1$–$C_4$alkyl, $C_1$–$C_4$alkoxy, or dimethylamino, and $R_{22}$ and $R_{23}$ independently from each other stand for hydrogen, $R_{21}$, $C_1$–$C_8$alkoxy, or dimethylamino, or —$NR_4R_5$, wherein $R_4$ and $R_5$, independently from each other stand for hydrogen, phenyl, or $C_1$–$C_8$alkyl-carbonyl, or —$NR_4R_5$ stands for a five- or six-membered ring system, and $R_3$ stands for allyl,

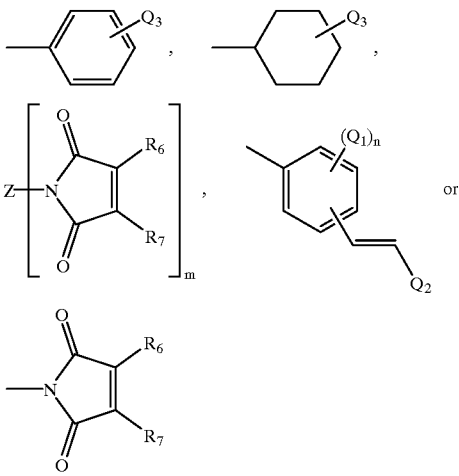

wherein $Q_3$ stands for hydrogen, halogen, $C_1$–$C_8$alkoxy, $C_1$–$C_8$alkyl-amido, unsubstituted or substituted $C_1$–$C_8$alkyl, unsubstituted or up to three times with halogen, —$NH_2$, —OH, or $C_1$–$C_8$alkyl substituted phenyl, and Z stands for a di- or trivalent radical selected from the group consisting of substituted or unsubstituted cyclohexylene, preferably 1,4-cyclohexylene, triazin-2,4,6-triyl, $C_1$–$C_6$alkylene, 1,5-naphthylene,

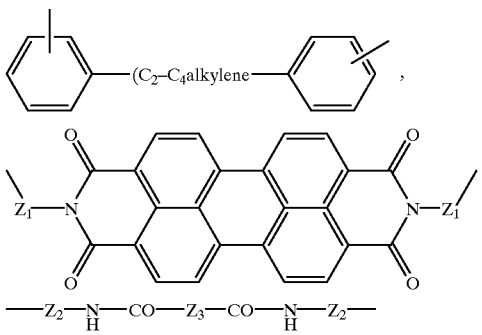

wherein $Z_1$, $Z_2$ and $Z_3$, independently from each other stand for cyclohexylene or up to three times with $C_1$–$C_4$alkyl substituted or unsubstituted phenylene, preferably unsubstituted or substituted 1,4-phenylene, and wherein $R_6$ and $R_7$, independently from each other, stand for

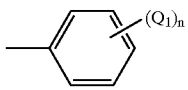

n stands for 1, 2 or 3, and m stands for 1 or 2, with the proviso, that $R_1$ and $R_2$ not simultaneously stand for phenyl, and its different uses such as in electroluminescent devices and as void detection compounds.

Compounds which are both, fluorescent and photostabile, are rare. This is mainly because fluorescence and photostability are usually incompatible with each other. The majority of fluorescent materials obtained to date are compositions employing fluorescent dyes, showing advantages of strong fluorescence, however, at the same time poor lightfastness, too. Hence, the known fluorescent materials are applied for only limited applications, e.g. interior uses, i.e. almost no uses are known for applications where high lightfastness is required.

In particular, perylene based compounds (especially compounds of the known LUMOGEN® series from BASF) for highly photostabile and fluorescent compounds are used by dissolving it into media such as plastics to give fluorescent compositions. However, their solubility is insufficient thereby failing in obtaining strong color strength of the corresponding compositions.

Further, EP-A 456,609 discloses the preparation and use of a benzoimidazoisoindolone as a highly photostabile and fluorescent pigment. However, this pigment exhibits only a weak solid-state fluorescence and a weak reflection color. In addition, the obtained color range is limited to only greenish yellow to yellow. Another disadvantage is that a kind of benzoimidazoisoindolone irritates the skin and crystal growth is too fast in a polymer matrix.

Also used are coumarin and rhodamine dyes dispersed in a plastic matrix (so-called fluorescent pigments). However, their photostability is poor.

Some maleimide derivatives are well-known compounds. E.g. J.Org.Chem. 42 (1977) 2819–2825 describes 1,2-diphenylmaleyl derivatives such as 1,2-diphenylmaleyl-N-cyclohexylimide as a protecting group for amino functions. Although it is mentioned that these compounds are yellow and fluorescent, no examples and no evaluation is given with regard to fluorescence properties and photostabilities.

Tetrahedron 51 (1995) 9941–9946 describe the synthesis of the marine alkaloid polycitrin, another red, fluorescent 1,2-diphenylmaleyl derivative, and intermediates thereof. However, the object of this work is not to show ways to enhance fluorescent properties and photostability of maleimide derivatives.

U.S. Pat. No. 4,596,867 describes the preparation of disubstituted maleic anhydride compounds. On col. 5 it is speculated that the imides of this compounds with amines such as t-butylaniline or octadecylamine can yield soluble compounds useful as fluorescent dyes and markers. However, no examples or other hints are given to support this statement. Rather, examples are directed to the preparation of polyimides in which the claimed anhydrides are reacted with diamines. In addition, there is no teaching of how to increase the photostability of fluorescent maleimide compounds.

Chem. Pharm. Bull. 28(7) (1980) 2178–2184 describes, too, diphenylmaleimides of the formula

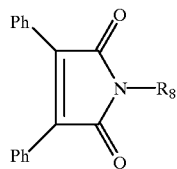

wherein $R_8$ stands for —CH$_2$Ph, —CH$_2$CH$_2$CH$_3$, —CH(CH$_3$)$_2$, and —CH$_2$CH(CH$_3$)$_2$. Although the compounds are described as yellow fluorescent compounds nothing is mentioned concerning increasing the properties of photostability and fluorescence.

JP-A2 50123664 describes a method for the preparation of

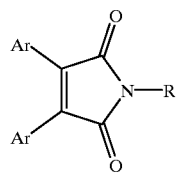

wherein R stands for $C_1$–$C_4$alkyl, phenyl or tolyl, and Ar stands for phenyl or tolyl. Explicitly, two compounds are prepared wherein Ar stands for phenyl, and R for n-butyl and phenyl, resp. However, nothing is mentioned about fluorescence and photostability. Rather, it is speculated that this compounds are usable as medical drugs, pesticides and starting materials thereof.

Chem. Ber. 26 (1893) 2479 describes the preparation of 3,4,3',4'-tetraphenyl-1,1'ethandiyl-bis-pyrrole-2,5-dione. However, nothing is known with regard to photostability, fluorescence, and its uses inter alia in electroluminescent devices.

EP-A 628,588 describes the use of bismaleimides, especially

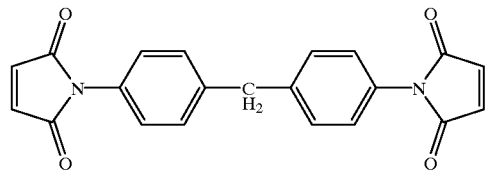

to increase the molecular weight of polyamides. However, no teaching is given with regard to the photostability and fluorescence of the mentioned compounds and other uses.

Hence, the object of the present invention was to provide photostabile fluorescent compounds, preferably exhibiting a high photostability and a strong solid-state and/or molecular state fluorescence. Further, another object is to broaden the range of available colors within this field, preferably strong reflection colors, combined with the abovementioned properties.

In addition, the provided compounds should be usable in electroluminescent devices as light-emitting substances, as void detection compounds, as inks for security printings, emitters for scintillators, light absorbers for solar collectors, light converters for agriculture etc.

Especially, fluorescent compounds should be provided which, compared to optical brighteners, have a superior solubility thus making an incorporation into paints and lacquers more easy. In addition, the fluorescent compounds should show fluorescence in the solid state, a superior photostability with no or only minimal products leading to discoloration of e.g. white coatings, a lesser migration, a lesser contamination of the working environment, fluorescence should be observed only at voids and not at the whole surface yielding a better contrast compared to e.g. optical brighteners and allowing the detection of minor defects or damages. Further, the fluorescent compounds should be useful in dark and white pigmented systems in which optical brighteners fail. Finally, fluorescent compounds with a superior photostability should be provided allowing long-term void detection, i.e. an inspection after months or maybe years after the application.

Accordingly, the aforementioned fluorescent maleimides were found. In addition, novel compounds, their preparation and uses of the provided compounds such as in electroluminescent devices and as void detection compounds were found, too.

A preferred embodiment of the present invention relates to fluorescent maleimides of the formula II

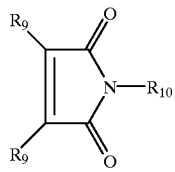

II wherein $R_9$ has the meaning of $R_1$, and $R_{10}$ stands for $R_3$.

Another preferred embodiment of the present invention relates to fluorescent maleimides of the formula III

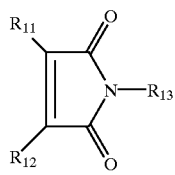

III wherein $R_{11}$ stands for $R_1$, and $R_{12}$ stands for $R_2$, wherein $R_{11}$ and $R_{12}$ do no stand simultaneously for the same substituent, $R_{13}$ stands for $R_3$.

Another preferred embodiment of the present invention relates to fluorescent maleimides of the formula IV

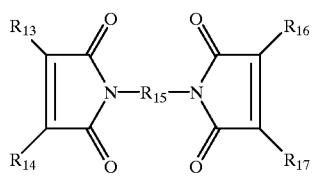

IV wherein $R_{13}$, $R_{14}$, $R_{16}$ and $R_{17}$ independently from each other stand for the radicals as defined under $R_1$, and $R_{15}$ stands for a single bond, or a divalent radical, preferably selected from the group consisting of substituted or unsubstituted cyclohexylen, preferably 1,4-cyclohexylene, $C_1$–$C_4$alkylene, 1,5-naphthylene,

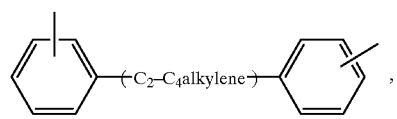

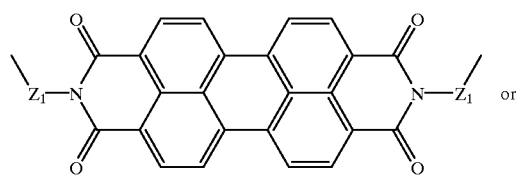

or

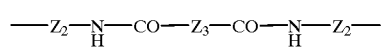

particularly preferred $R_{15}$ stands for a single bond, 2,5-di-tert.-butyl-1,4-phenylene, 1,2-ethylene, 1,5-naphthylene, 2,5-dimethyl-1,4-phenylene, 4,5-dimethyl-1,4-phenylene, trans-1,4-cyclohexylene,

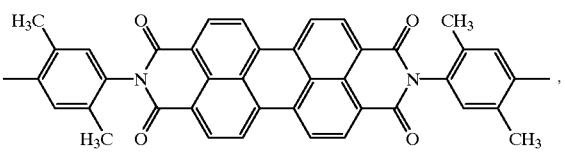

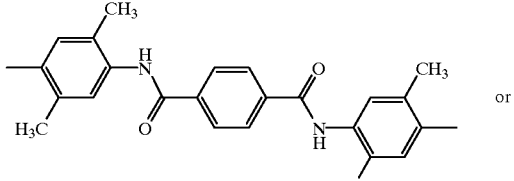

or

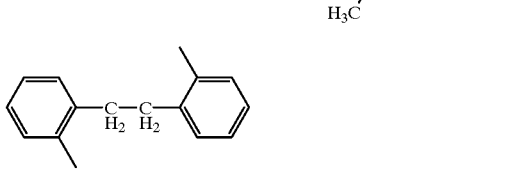

Particularly preferred inventive compounds are the following compounds:

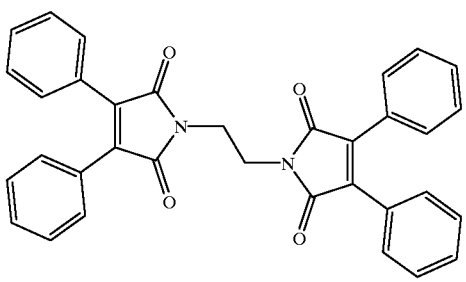

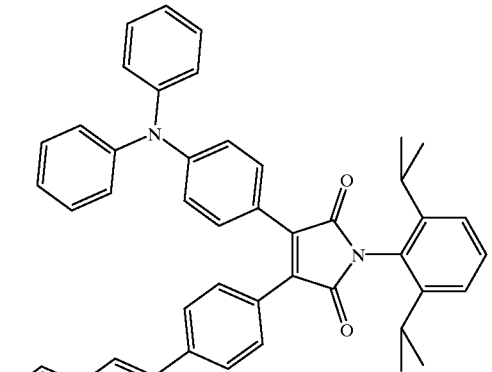

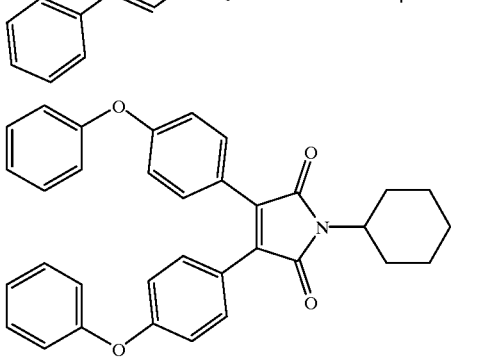

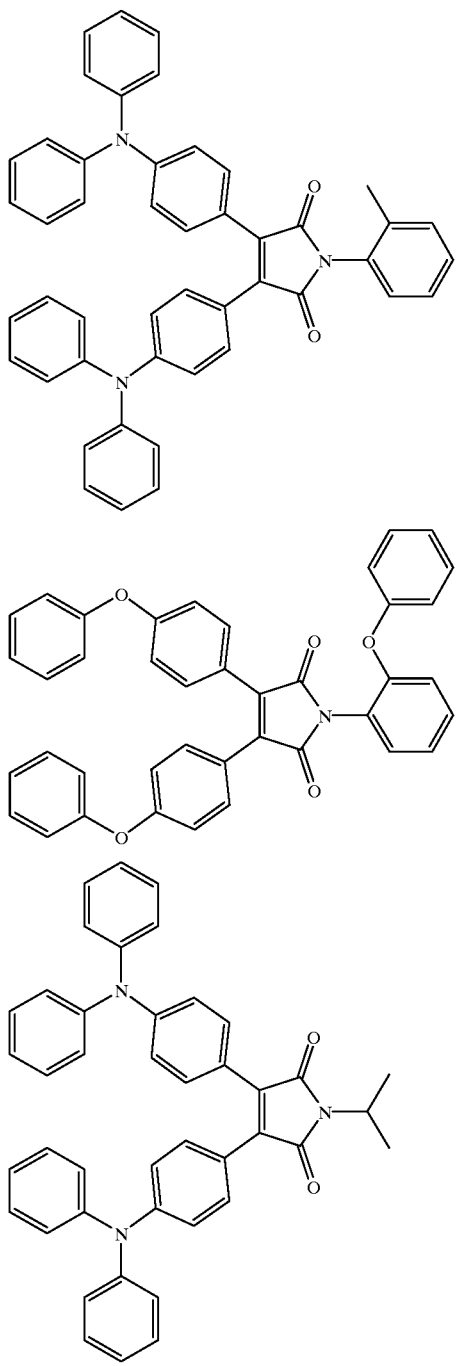

C₁–C₈alkyl is typically linear or branched—where possible—methyl, ethyl, n-propyl, isopropyl, n-butyl, sec.-butyl, isobutyl, tert.-butyl, n-pentyl, 2-pentyl, 3-pentyl, 2,2-dimethylpropyl, n-hexyl, n-heptyl, n-octyl, 1,1,3,3-tetramethylbutyl and 2-ethylhexyl, more preferably C₁–C₄alkyl such as typically methyl, ethyl, n-propyl, isopropyl, n-butyl, sec.-butyl, isobutyl, tert.-butyl.

C₁–C₆alkylene is typically methylene, 1,1-, 1,2-ethylene, 1,3-propylene, 1,4-butylene, 1,5-pentylene, 1,6-hexylene.

C₁–C₈alkoxy is typically methoxy, ethoxy, n-propoxy, isopropoxy, n-butoxy, sec.-butoxy, isobutoxy, tert.-butoxy, n-pentoxy, 2-pentoxy, 3-pentoxy, 2,2-dimethylpropoxy, n-hexoxy, n-heptoxy, n-octoxy, 1,1,3,3-tetramethylbutoxy and 2-ethylhexoxy, preferably C₁–C₄alkoxy such as typically methoxy, ethoxy, n-propoxy, isopropoxy, n-butoxy, sec.-butoxy, isobutoxy, tert.-butoxy.

Halogen stands for fluoro, chloro, bromo or iodo, preferably for chloro or bromo.

C₁–C₈alkyl-carbonyl is typically methyl-carbonyl (=acetyl), ethyl-carbonyl, n-propyl-carbonyl, isopropyl-carbonyl, n-butyl-carbonyl, sec.-butyl-carbonyl, isobutyl-carbonyl, tert.-butyl-carbonyl, n-pentyl-carbonyl, 2-pentyl-carbonyl, 3-pentyl-carbonyl, 2,2-dimethylpropyl-carbonyl, n-hexyl-carbonyl, n-heptyl-carbonyl, n-octyl-carbonyl, 1,1,3,3-tetramethylbutyl-carbonyl and 2-ethylhexyl-carbonyl, more preferably C₁–C₄alkyl-carbonyl such as typically methyl-carbonyl, ethyl-carbonyl, n-propyl-carbonyl, isopropyl-carbonyl, n-butyl-carbonyl, sec.-butyl-carbonyl, isobutyl-carbonyl, tert.-butyl-carbonyl.

C₁–C₈alkyl-amido is typically acetamido, ethaneamido, n-propaneamido, isopropaneamido, n-butane-amido, sec.-butane-amido, isobutane-amido, tert.-butane-amido, n-pentane-amido, 2-pentane-amido, 3-pentane-amido, 2,2-dimethylpropane-amido, n-hexane-amido, n-heptane-amido, n-octane-amido, 1,1,3,3-tetramethylbutane-amido and 2-ethylhexane-amido, more preferably C₁–C₄alkane-amido such as typically acetamido, ethaneamido, n-propaneamido, isopropaneamido, n-butaneamido, sec.-butaneamido, isobutaneamido, tert.-butaneamido.

If —NR₄R₅ stand for a five- or six-membered ring system, the following ring systems are preferred: 4-morpholinyl (=morpholino),1-indolinyl, 1- or 2-piperidyl, 1-piperazinyl, 1-indolinyl, 2-isoindolinyl, 1-quinuclidinyl, 1-pyrrolidinyl, and 9-carbazolyl.

The inventive maleyl derivatives I to IV can be synthesized starting from the corresponding maleic anhydrides and amines in analogy to methods well known in the art such as described in Tetrahedron Letters 31(36) (1990) 5201–5204, J.Org.Chem. 42 (17) (1977) 2819–2825, Chem. Pharm. Bull. 28(7) (1980) 2178–2184, or by methods described in Tetrahedron 51(36) (1995) 9941–9946 or JP-A2 50123664.

In a preferred embodiment the corresponding diarylmaleic anhydride of the formula V

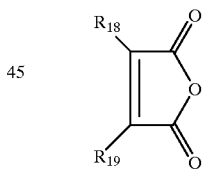

V wherein R₁₈ and R₁₉, independently from each other stand for R₁ or R₂, is reacted with an amine H₂N—R₃ or diamine H₂N—Z—NH₂.

The corresponding maleic anhydrides are known or can be prepared in analogy to known methods e.g. as described in J.Org.Chem. 55 (1990) 5165–5170 or U.S. Pat. No. 4,596,867, or as described in detail below. Amines H₂N—R₃ and diamines H₂N—Z—NH₂ are also known and commercially available from chemical suppliers.

Usually the molar ratio of anhydride V to amine H₂N—R₃ is chosen in the range of from 0.1:1 to 2:1. Usually the molar ratio of anhydride V to diamine H₂N—Z—NH₂ is chosen in the range of from 0.5:1 to 5:1.

Preferably, the reaction is carried out in the presence of a solvent, wherein the amount of solvent usually is chosen in the range of from 5 to 50 weight-%, related to the diarylmaleic anhydride V.

As solvents usual organic solvents such as acetic acid, toluene, dimethylformamide or a mixture thereof can be chosen.

The reaction temperature preferably is chosen in the range of from 80 to 150, more preferred from 100 to 120° C.

The reaction time—usually depending from the chosen reaction temperature—preferably is chosen in the range of from 2 to 20 hours.

After removal of the solvent, the product can be purified by known methods if desired, e.g. by chromatography, or crystallization.

If so-called unsymmetrical maleimides I or IV are desired, i.e. $R_3$ stands for e.g.

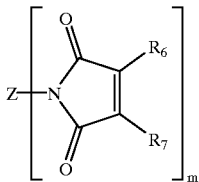

wherein $R_6$ and $R_7$ stand for a substituent as described for $R_1$ and $R_2$, but are different from the chosen $R_1$ and $R_2$, or in formula IV $R_{13}$ and $R_{14}$ are different from $R_{16}$ and $R_{17}$, then it is preferred to add small amounts of anhydride V to a surplus of diamine $H_2N$—Z—$NH_2$, isolate the obtained product Va Va

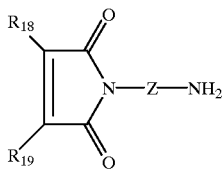

and react this amine Va with another anhydride V, in which the aryl substituents, e.g. $R_6$ and $R_7$ or $R_{16}$ or $R_{17}$, are chosen differently from $R_{18}$ and $R_{19}$. Of course other possibilities shall not be excluded, e.g. if one amino group of the diamine is protected etc.

Another preferred embodiment relates to a process for the preparation of maleimides I, wherein in a first step the diarylmaleic anhydride V is reacted with ammonium acetate to yield the intermediate Vb Vb

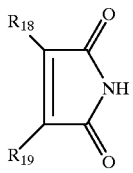

Intermediate Vb then is reacted with a base, and the obtained anion in a subsequent step with a halogen compound X—$R_3$ or X—Z—X to yield a desired product according to formula I.

Usually, the molar ratio of diarylmaleic anhydride V to ammonium acetate is chosen in the range of from 0.01:1 to 0.5:1, preferably from 0.05:1 to 0.15:1.

Preferably, the reaction temperature is chosen in the range of from 80 to 130° C., more preferably under reflux conditions of the reaction mixture. It is preferred, too, to carry out the reaction in a solvent. The amount of solvent preferably is chosen in the range of from 10 to 100 weight-%, related to the amount of diarylmaleic anhydride V.

As solvent usual organic solvents such as toluene, DMF, or a mixture thereof, or acetic acid, preferably acetic acid can be used.

Generally, the reaction time is chosen in the range of from three to 20 hours.

The desired intermediate Vb can be worked up in usual ways such as filtering, washing, and—if desired—further purification by chromatography.

The molar ratio of the base and intermediate Vb preferably is chosen in the range of from 1:1 to 5:1.

As a base an alkali metal alkoxide, an alkali metal hydride such as potassium tert.-butoxide, sodium hydride or potassium hydride, preferably sodium hydride, can be used.

Preferably, the reaction with the base is carried out in the presence of a solvent. The amount of solvent can be chosen in the range of from 5 to 100 weight-%, related to intermediate Vb. As solvent usual organic solvents such as N-methylpyrrolidone ("NMP"), or dimethyl formamide ("DMF"), preferably DMF, can be used.

The reaction temperature usually is chosen in the range of from 20 to 80° C., preferably room temperature.

The reaction time usually is chosen in the range of from 0.5 to 5 hours.

Preferably, the reaction mixture is not worked up.

Then, halogen compound X—$R_3$ or X—Z—X is added to the obtained reaction mixture. Usually, the molar ratio of X—$R_3$ or X—Z—X to intermediate Vb is chosen in the range of from 1:1 to 10:1.

The reaction temperature usually is chosen in the range of from 20 to 120° C., preferably room temperature.

The reaction time usually is chosen in the range of from 0.5 to 10 hours.

After adding water to the reaction mixture, usually 0.5 to 10 times in volume related to the amount of solvent, if desired, the obtained diarylmaleimide can be worked up in usual ways such as extraction and/or chromatography.

Another preferred embodiment relates to a process for the preparation of diarylmaleic anhydrides V in which a glyoxylic acid derivative VI

VI

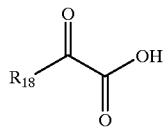

is treated with a base and, subsequently, the thus obtained salt VIa is reacted with a carboxylic acid VII

VII

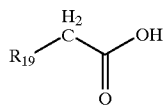

wherein (a) $R_{18}$ stands for $R_1$ and $R_{19}$ for $R_1$ or $R_2$, or (b) $R_{18}$ stand for $R_2$ and $R_{19}$ $R_1$.

Usually, the molar ratio of the base to glyoxylic acid derivative VI is chosen in the range of from 1:1 to 20:1, preferably from 1.5:1 to 3:1.

As a rule, the temperature during the formation of the salt VIa is chosen in the range of from 50 to 110, preferably from 70 to 80° C.

Preferably, the salt-formation of VIa is carried out in the presence of an aliphatic alcohol such as $C_1$–$C_4$alkanols such as methanol, ethanol, n-, i-propanol, n-, iso-, sek.-, tert.-butanol. The amount of solvent usually is chosen in the range of from 3 to 100, based on the amount of glyoxylic acid derivative VI.

As a base preferably alkoxides such as alkali metal alkoxides, more preferably alkali metal salts of $C_1$–$C_4$alkanols such as sodium methanoate, potassium methanoate, sodium acetate, potassium acetate, sodium n-propanoate, potassium n-propanoate, sodium n-, iso-, sek.-, tert. butanoate, potassium n-, iso-, sek.-, tert.-butanoate, preferably potassium tert.-butanoate, can be used.

Usually, the reaction time is chosen in the range of from 0.5 to 5 hours.

As a rule, the obtained salt VIa is separated from the reaction mixture, preferably followed by removal of the solvent and drying over in an atmosphere under reduced pressure.

In the second step of the above process the salt VIa is mixed with the carboxylic acid VII usually in the presence of acetic anhydride at a temperature in the range of from 80 to 140° C., preferably under reflux conditions of the reaction mixture.

In general, the molar ratio of glyoxylic acid salt derivative VIa to carboxylic acid VII is chosen preferably in the range of from 5:1 to 0.2:1, preferably from 0.8:1 to 1.2:1.

Generally, the amount of acetic anhydride to the amount of glyoxylic acid salt derivative VIa is chosen preferably in the range of from 0.05:1 to 1:1, preferably from 0.1:1 to 0.2:1.

Usually, the reaction time of this second step is chosen in the range of from 0.5 to 10, preferably from one to three hours. The isolation of the product can be carried out by known methods in the art, e.g. removing of acetic anhydride by distillation, preferably under an atmosphere of reduced pressure, followed by washing the product with appropriate organic solvents such as acetone or ethyl acetate or by crystallization or chromatography etc.

The carboxylic acid VII can be obtained by reducing the glyoxylic acid derivative VI with a reducing agent such as hydrazine under basic conditions.

In a preferred embodiment the glyoxylic acid derivative VI is treated with hydrazine or hydrazine monohydrate in a temperature range of from 70 to 120° C., preferably under reflux conditions, usually for 0.2 to 2 hours. Thereafter, a base such as a alkali metal or earth alkaline metal hydroxide such as sodium hydroxide or potassium hydroxide is added to the reaction mixture after cooling down to a temperature in the range of from 80 to 100, preferably from 95 to 100° C., and then heated to a temperature range of from 100 to 120° C., preferably under reflux conditions for 2 to 10 hours. Afterwards, the hydrazine is removed e.g. by distillation, and the thus obtained reaction mixture preferably is acidified with a mineral acid such as hydrochloric acid, sulfuric acid, nitric acid, preferably hydrochloric acid, to a pH in the range of from 2 to 4. After that the product can be isolated e.g. by extraction with an appropriate solvent such as methylene chloride, followed e.g. by crystallization or column chromatography.

The molar ratio of hydrazine to glyoxylic acid derivative VI usually is chosen in the range of from 2:1 to 20:1, preferably from 5:1 to 10:1.

The amount of the base usually is chosen in the range of from 2 to 10, preferably from 3 to 5 weight-%, related to glyoxylic acid derivative VI.

The glyoxylic acid derivative VI can be obtained by saponification of ester VIII

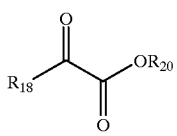

VIII wherein $R_{20}$ stands for $C_1$–$C_4$alkyl, in analogy to known methods.

Preferably, ester VII is treated with a base such as an alkali metal hydroxide, preferably sodium hydroxide, potassium hydroxide, and the like in the presence of a polar solvent such as an $C_1$–$C_4$alkanol or an aqueous solution thereof. In a preferred embodiment the saponification is carried out in the presence of a mixture of water and an alkanol $R_{20}$OH in a volume ratio of 5:1 to 0.5:1. Further it is preferred to carry out the saponification at an elevated temperature, such as in the range of from 70 to 100° C., preferably under reflux conditions at ambient pressure.

The reaction time mainly depends on the reactivity of the educts and the chosen temperature. E.g. under reflux conditions the reaction time usually is chosen in the range of from one five hours.

After that, the reaction mixture usually is acidified with an acid to a pH range of from 2 to 4. As an acid mineral acids such as hydrochloric acid, sulfuric acid and nitric acid, preferably hydrochloric acid, can be used.

Generally, the desired glyoxylic acid derivative VII is isolated from the reaction mixture by known methods such as extraction, crystallization, chromatography, preferably extraction.

The starting material, ester VIII, can be prepared by treating the aryl compound with the halogen glyoxylate X

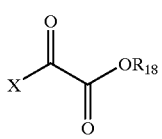

X wherein X stands for a halogen, preferably for chlorine or bromine, in the presence of $AIX_3$ and a solvent.

In a preferred embodiment, a mixture of $AIX_3$ in a solvent such as methylene chloride is added portionwise, preferably dropwise, to a mixture of compounds IX and X.

Usually, the molar ratio of aryl compound IX to halogen glyoxylate X is chosen in the range of from 0.5:1 to 5:1, preferably from 0.8:1 to 2:1.

The amount of $AIX_3$ preferably is chosen in the range of from 1 to 2 weight-%, related to the amount of glyoxylate X.

During the addition of $AIX_3$ to the mixture of compound IX and glyoxylate X, the reaction temperature is chosen preferably in the range of from −10 to 20, more preferably from 0 to 5° C. After the addition the reaction temperature usually is chosen in the range of from 10 to 40° C., the preferred temperature is room temperature.

The reaction time generally is in the range of from 3 to 20 hours.

Thereafter, the reaction mixture preferably is treated with water, preferably ice and acidified to a pH in the range of from 2 to 4 with one of the above mentioned mineral acids, preferably diluted hydrochloric acid. The isolation of he product can be carried out with methods well known in the art such as extraction with dichloromethane or diethylether. If desired the ester II can be further purified e.g. by chromatography.

Other compounds such as the intermediate

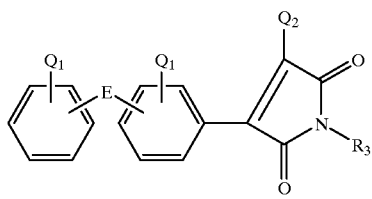

can be prepared in analogy to the abovementioned process.

Another embodiment of the present invention relates to the use of the claimed maleimides as well for all other fluorescent maleimides according to the general formula given in this application or mentioned in the examples for scintillator films for the detection of atomic and nuclear radiation. In their simplest form these detectors usually consist of a polymer matrix, such as polystyrene, containing low concentrations of a fluorescent maleimide as fluorophore or an energy donor/acceptor mixture containing a fluorescent maleimide as a key component.

Another embodiment of the present invention relates to the use of the claimed fluorescent maleimides or those known compounds mentioned additionally in the examples for the preparation and use of luminescent solar energy collectors. The operation of a luminescent solar concentrator usually is based on the absorption of solar radiation in a collector containing a fluorescent species in which the emission bands have little or no overlap with the absorption bands. Generally, the fluorescence emission is trapped by total internal reflection and concentrated at the edges of a collector, which is usually a thin flat plate, to the edge of which a p-n junction photovoltaic ribbon is fixed and the light energy converted to electrical energy. Luminescent solar collectors usually can collect both direct and diffuse light, and there is a good heat dissipation of non-utilized energy. Tracking of the sun usually is unnecessary and fluorescent species can be selected to allow matching if the concentrated light to the maximum sensitivity of the photovoltaic cell.

A further embodiment of this invention relates to the use of the claimed fluorescent maleimides or those known compounds mentioned additionally in the examples for the preparation and use of printing inks such as gravure, flexo and off-set inks preferably for publication, packagings and laminations, as well as non-impact printings such as ink jet printing inks and electrophotographic toners for printers and copy machines. The maleimides can be applied in the usual method known in the art. The inks can be used also in a way known in the art for functional inks as well as for security printings for banknotes and indicators.

Another embodiment of the present invention is related to a method of coloring high molecular organic materials (having a molecular weight usually in the range of from $10^3$ to $10^7$ g/mol) by incorporating the inventive fluorescent compounds by known methods in the art.

As high molecular weight organic materials the following can be used such as biopolymers, and plastic materials, including fibers.

The present invention relates preferably to the use of the inventive maleimides I for the preparation of inks, for printing inks in printing processes, for flexographic printing, screen printing, packaging printing, security ink printing, intaglio printing or offset printing, for pre-press stages and for textile printing, for office, home applications or graphics applications, such as for paper goods, for example, for ballpoint pens, felt tips, fiber tips, card, wood, (wood) stains, metal, inking pads or inks for impact printing processes (with impact-pressure ink ribbons), for the preparation of colorants, for coating materials, for industrial or commercial use, for textile decoration and industrial marking, for roller coatings or powder coatings or for automotive finishes, for high-solids (low-solvent), water-containing or metallic coating materials or for pigmented formulations for aqueous paints, for the preparation of pigmented plastics for coatings, fibers, platters or mold carriers, for the preparation of non-impact-printing material for digital printing, for the thermal wax transfer printing process, the ink jet printing process or for the thermal transfer printing process, and also for the preparation of color filters, especially for visible light in the range from 400 to 700 nm, for liquid-crystal displays (LCDs) or charge combined devices (CCDs) or for the preparation of cosmetics or for the preparation of polymeric ink particles, toners, dry copy toners liquid copy toners, or electrophotographic toners, and electroluminescent devices.

Illustrative examples of suitable organic materials of high molecular weight which can be colored with the inventive fluorescent maleimides of this invention are vinyl polymers, for example polystyrene, poly-α-methylstyrene, poly-p-methylstyrene, poly-p-hydroxystyrene, poly-p-hydroxyphenylstyrene, polymethyl methacrylate and polyacrylamide as well as the corresponding methacrylic compounds, polymethylmaleate, polyacrylonitrile, polymethacrylonitrile, polyvinyl chloride, polyvinyl fluoride, polyvinylidene chloride, polyvinylidene fluoride, polyvinyl acetate, polymethyl vinyl ether and polybutyl vinyl ether; polymers which are derived from maleinimide and/or maleic anhydride, such as copolymers of maleic anhydride with styrene; polyvinyl pyrrolidone; ABS; ASA; polyamides; polyimides; polyamidimides; polysulfones; polyether sulfones; polyphenylene oxides; polyurethanes; polyureas; polycarbonates; polyarylenes; polyarylene sulfides; polyepoxides; polyolefins such as polyethylene and polypropylene; polyalkadienes; biopolymers and the derivatives thereof e.g. cellulose, cellulose ethers and esters such as ethylcellulose, nitrocellulose, cellulose acetate and cellulose butyrate, starch, chitin, chitosan, gelatin, zein; natural resins; synthetic resins such as alkyd resins, acrylic resins, phenolic resins, epoxide resins, aminoformaldehyde resins such as urea/formaldehyde resins and melamine/formaldehyde resin; vulcanized rubber; casein; silicone and silicone resins; rubber, chlorinated rubber; and also polymers which are used, for example, as binders in paint systems, such as novolaks which are derived from $C_1$–$C_6$-aldehydes such as formaldehyde and acetaldehyde and a binuclear or mononuclear, preferably mononuclear, phenol which, if desired, is substituted by one or two $C_1$–$C_9$alkyl groups, one or two halogen atoms or one phenyl ring, such as o-, m- or p-cresol, xylene, p-tert.-butylphenol, o-, m- or p-nonylphenol, p-chlorophenol or p-phenylphenol, or a compound having more than one phenolic group such as resorcinol, bis(4-hydroxyphenyl)methane or 2,2-bis(4-hydroxyphenyl)propane; as well as suitable mixtures of said materials.

Particularly preferred high molecular weight organic materials, in particular for the preparation of a paint system, a printing ink or ink, are, for example, cellulose ethers and esters, e.g. ethylcellulose, nitrocellulose, cellulose acetate and cellulose butyrate, natural resins or synthetic resins (polymerization or condensation resins) such as aminoplasts, in particular urea/formaldehyde and melamine/formaldehyde resins, alkyd resins, phenolic plastics, polycarbonates, polyolefins, polystyrene, polyvinyl chloride, polyamides, polyurethanes, polyester, ABS, ASA, polyphenylene oxides, vulcanized rubber, casein, silicone and silicone resins as well as their possible mixtures with one another.

It is also possible to use high molecular weight organic materials in dissolved form as film formers, for example boiled linseed oil, nitrocellulose, alkyd resins, phenolic resins, melamine/formaldehyde and urea/formaldehyde resins as well as acrylic resins.

Said high molecular weight organic materials may be obtained singly or in admixture, for example in the form of granules, plastic materials, melts or in the form of solutions, in particular for the preparation of spinning solutions, paint systems, coating materials, inks or printing inks.

In a particularly preferred embodiment of this invention, the inventive fluorescent maleimides I are used for the mass coloration of polyvinyl chloride, polyamides and, especially, polyolefins such as polyethylene and polypropylene as well as for the preparation of paint systems, including powder coatings, inks, printing inks, color filters and coating colors.

Illustrative examples of preferred binders for paint systems are alkyd/melamine resin paints, acryl/melamine resin paints, cellulose acetate/cellulose butyrate paints and two-pack system lacquers based on acrylic resins which are crosslinkable with polyisocyanate.

According to observations made to date, the inventive fluorescent maleimides I can be added in any desired amount to the material to be colored, depending on the end use requirements. In the case of high molecular weight organic materials, for example, the fluorescent maleimides I prepared according to this invention can be used in an amount in the range from 0.01 to 40, preferably from 0.01 to 5% by weight, based on the total weight of the colored high molecular weight organic material.

For the preparation of paints systems, coating materials, color filters, inks and printing inks, the corresponding high molecular weight organic materials, such as binders, synthetic resin dispersions etc. and the inventive fluorescent maleimides I are usually dispersed or dissolved together, if desired together with customary additives such as dispersants, fillers, paint auxiliaries, siccatives, plasticizers and/or additional pigments or pigment precursors, in a common solvent or mixture of solvents. This can be achieved by dispersing or dissolving the individual components by themselves, or also several components together, and only then bringing all components together, or by adding everything together at once.

Hence, a further embodiment of the present invention relates to a method of using the inventive fluorescent maleimides I for the preparation of dispersions and the corresponding dispersions, and paint systems, coating materials, color filters, inks and printing inks comprising the inventive fluorescent maleimides I.

A particular embodiment of this invention concerns ink jet inks comprising the inventive fluorescent compositions.

The desired ink may contain up to 30% by weight of the fluorescent composition, but will generally be in the range of 0.1 to 10, preferably from 0.1 to 8% by weight of the total ink composition for most thermal ink jet printing applications.

Further, the inks usually contain polymeric dispersants such as random, block, branched or graft polymers or copolymers. Most preferred are polymeric dispersants made by the group transfer polymerization process, because in general these are free from higher molecular weight species that tend to plug pen nozzles.

Representative compounds useful for this purpose include e.g. polymers of polyvinyl alcohol, cellulosics and ethylene oxide modified polymers, and dispersant compounds containing ionisable groups such as acrylic acid, maleic acid or sulfonic acid.

The polymeric dispersant is generally present in an amount in the range of from 0.1 to 30, preferably from 0,1 to 8% by weight of the total ink composition.

In addition to, or in place of the preferred polymeric dispersants, surfactants may be used as dispersants. These may be anionic, nonionic, or amphoteric surfactants. A detailed list of non-polymeric as well as some polymeric dispersants is disclosed in the section on dispersants of Manufacturing Confection Publishing Co., (1990) p. 110–129, McCutcheon's Functional Materials, North America Edition.

Usually the ink contains an aqueous medium such as water or a mixture of water and at least one water-soluble organic solvent. Water-soluble organic solvents are well known, representative examples of which are disclosed in e.g. U.S. Pat. No. 5,085,698. Selection of a suitable mixture of water and water-soluble organic solvent depends on usually requirements of the specific application such as desired surface tension and viscosity, drying time of the ink, and the media substrate onto which the ink will be printed.

Particularly preferred is a mixture of a water-soluble solvent having at least two hydroxyl groups, e.g. diethylene glycol, and water, especially deionized water.

In the event that a mixture of water and a water-soluble organic solvent is used as aqueous medium, water usually would comprise from 30 to 95, preferably 60 to 95% by weight, based on the total weight of the aqueous medium.

The amount of aqueous medium generally is in the range of from 70 to 99.8, preferably from 84 to 99.8%, based on the total weight of the ink.

The ink may contain other ingredients well known to those skilled in the art such as surfactants to alter surface tension as well as to maximize penetration. However, because surfactants may destabilize dispersions, care should be taken to insure compatibility of the surfactant with the other ink components. In general, in aqueous inks, the surfactants may be present in amounts ranging from 0.01 to 5, preferably from 0.2 to 3% by weight, based on the total weight of the ink.

Biocides may be used in the ink compositions to inhibit growth of microorganisms. Sequestering agents such as EDTA may also be included to eliminate deleterious effects of heavy metal impurities. Other known additives, such as viscosity modifiers may also be added.

A further embodiment concerns the use of the inventive fluorescent compounds I in phase change ink jet inks. The preparation of such inks is well known in the art, e.g. described in detail in EP-A 816, 410.

For the pigmentation of high molecular weight organic material, the inventive maleimides I, optionally in the form of masterbatches, usually are mixed with the high molecular weight organic materials using roll mills, mixing apparatus or grinding apparatus. Generally, the pigmented material is subsequently brought into the desired final form by conventional processes, such as calandering, compression molding, extrusion, spreading, casting or injection molding. In order to prepare non-rigid moldings or to reduce their brittleness it is often desired to incorporate so-called plasticizers into the high molecular weight organic materials prior to forming. Examples of compounds which can be used as such plasticizers are esters of phosphoric acid, phthalic acid or sebacic acid. The plasticizers can be added before or after the incorporation of the inventive maleimides I into the polymers. It is also possible, in order to achieve different hues, to add fillers or other coloring constituents such as white, color or black pigments in desired amounts to the high molecular weight organic materials in addition to the inventive maleimides I.

For pigmenting lacquers, coating materials and printing inks the high molecular weight organic materials and the inventive maleimides I, alone or together with additives, such as fillers, other pigments, siccatives or plasticizers, are generally dissolved or dispersed in a common organic solvent or solvent mixture. In this case it is possible to adopt a procedure whereby the individual components are dispersed or dissolved individually or else two or more are dispersed or dissolved together and only then are all of the components combined.

The present invention additionally relates to inks comprising a coloristically effective amount of the pigment dispersion of the inventive maleimides I.

Processes for producing inks especially for ink jet printing are generally known and are described for example in U.S. Pat. No. 5,106,412.

The inks can be prepared, for example, by mixing the pigment dispersions comprising the inventive maleimides I with polymeric dispersants.

The mixing of the pigment dispersions with the polymeric dispersant takes place preferably in accordance with generally known methods of mixing, such as stirring or mechanical mixing; it is preferably advisable to use intensive mechanical mixers such as the so-called ULTRATURAX® from Kunkel & Jahn, Staufen (Germany).

When mixing a maleimide I with polymeric dispersants it is preferred to use a water-dilutable organic solvent.

The weight ratio of the pigment dispersion to the ink in general is chosen in the range of from 0.001 to 75% by weight, preferably from 0.01 to 50% by weight, based on the overall weight of the ink.

Examples of suitable polymeric dispersants are carboxyl-containing polyacrylic resins such as polymeric methacrylic or crotonic acids, especially those obtained by addition polymerization of acrylic acid or acrylic acid and other acrylic monomers such as acrylates. Depending on the field of use or when using maleimides I, it is also possible, if desired, to admix a small proportion of a water-miscible organic solvent in from 0.01 to 30% by weight, based on the overall weight of the ink, and/or to admix water and/or bases so as to give a pH in the range from 7 to 11. It may likewise be advantageous to add preservatives, antifoams, surfactants, light stabilizers and pH regulators, for example, to the ink of the invention, depending on the field of use.

Examples of suitable pH regulators are inorganic salts such as lithium hydroxide or lithium carbonate, quaternary ammonium hydroxide or ammonium carbonate. Examples of preservatives and antifoams are, for example, sodium dehydroacetate, 2,2-dimethyl-6-acetoxydioxane or ammonium thioglycolate. It is also possible to employ known agents which regulate the viscosity or the surface tension and are described in e.g. U.S. Pat. No. 5,085,698.

Examples of water-miscible organic solvents are aliphatic $C_1$–$C_4$ alcohols, such as methanol, ethanol, n-propanol, isopropanol, n-butanol, tert.-butanol, ketones such as acetone methyl ethyl ketone, methyl isobutyl ketone or diacetone alcohol, and also polyols, Cellosolves® and carbitols, such as ethylene glycol, diethylene glycol, triethylene glycol, glycerol, propylene gylcol, ethylene glycol monomethyl or monoethyl ether, propylene glycol methyl ether, dipropylene glycol methyl ether, tripropylene glycol methyl ether, ethylene glycol phenyl ether, propylene glycol phenyl ether, diethylene glycol monomethyl or monoethyl ether, diethylene glycol monobutyl ether, triethylene glycol monomethyl or monoethyl ether, and also N-methyl-2-pyrrolidone, 2-pyrrolidone, N,N'-dimethylformamide or N,N'-dimethylacetamide.

If desired, the ink prepared as described above can be worked up further. The working up of the ink can be carried out by the customary methods for working up dispersions, by separation techniques, such as sieving or centrifuging the coarse particles from the resulting dispersion. It has been found advantageous, too, to carry out centrifuging in two stages of different intensity, e.g. centrifuging in a first step for from ten minutes to one hour at from 2000 to 4000 rpm and then, in a second step, for from 10 minutes to one hour at from 6000 to 10000 rpm.

Following centrifuging or sieving, the dispersion usually can be used directly as an ink for ink jet printing, for example.

The present invention additionally relates to a process for producing color filters comprising a transparent substrate and applied thereon a red, blue and green layer in any desired sequence, by using a red compound I and known blue and green compounds. The different colored layers preferably exhibit patterns such that over at least 5% of their respective surface they do not overlap and with very particular preference do not overlap at all.

The preparation and use of color filters or color-pigmented high molecular weight organic materials are well-known in the art and described e.g. in Displays 14/2, 1151 (1993), EP-A 784085, or GB-A 2,310,072.

The color filters can be coated for example using inks, especially printing inks, which can comprise pigment dispersions comprising the inventive maleimides I or can be prepared for example by mixing a pigment dispersion comprising a maleimides I with chemically, thermally or photolytically structurable high molecular weight organic material (so-called resist). The subsequent preparation can be carried out, for example, in analogy to EP-A 654 711 by application to a substrate, such as a LCD, subsequent photostructuring and development.

Particular preference for the production of color filters is given to pigment dispersions comprising a maleimides I which possess non-aqueous solvents or dispersion media for polymers.

The present invention relates, moreover, to toners comprising a pigment dispersion containing a maleimide I or a high molecular weight organic material pigmented with a maleimide I in a coloristically effective amount. In a particular embodiment of the process of the invention, toners, coating materials, inks or colored plastics are prepared by processing masterbatches of toners, coating materials, inks or colored plastics in roll mills, mixing apparatus or grinding apparatus.

The present invention additionally relates to colorants, colored plastics, polymeric ink particles, or non-impact-printing material comprising an inventive maleimide I pigment, preferably in the form of a dispersion, or a high molecular weight organic material pigmented with a maleimide I in a coloristically effective amount.

A coloristically effective amount of the pigment dispersion according to this invention comprising an inventive maleimide I denotes in general from 0.0001 to 99.99% by weight, preferably from 0.001 to 50% by weight and, with particular preference, from 0.01 to 50% by weight, based on the overall weight of the material pigmented therewith.

Further, the inventive compounds I can be used for textile application and for the dying of paper.

A further embodiment of the present invention relates to the use of the fluorescent maleimides of the general formula I and of the formula Ia

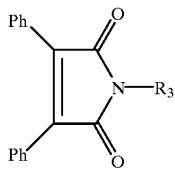

for the preparation of and use in organic electroluminescent ("EL") devices. Such EL devices are well-known in the art (e.g. described in Appl. Phys. Lett. 51 (1987) 913).

In a preferred embodiment EL devices are used which have the following compositions:

(i) an anode/a hole transporting layer/an electron transporting layer/a cathode in which the inventive compounds I or compounds Ia are used either as positive-hole transport compounds, which is exploited to form the light emitting and hole transporting layers, or as electron transport compounds, which can be exploited to form the light-emitting and electron transporting layers, and (ii) an anode/a hole transporting layer/a light-emitting layer/an electron transporting layer/a cathode, in which the inventive compounds I or compounds Ia form the light-emitting layer regardless of whether they exhibit positive-hole or electron transport properties in this constitution. It is possible that the light emitting layer can consist of two or more fluorescent substances of formulae I or Ia for energy donor(s) and energy acceptor(s).

The devices can be prepared in several well-known ways. Generally, vacuum evaporation is extensively used for the preparation. The devices can be prepared in several ways. Usually, vacuum evaporation is extensively used for the preparation. Preferably, the organic layers are laminated in the above order on a commercially available indium-tin-oxide ("ITO") glass substrate held at room temperature, which works as the anode in the constitutions. The membrane thickness is preferably in the range of 1 to $10^4$ nm, more preferably 1 to 5000 nm, more preferably 1 to $10^3$ nm, more preferably 1 to 500 nm. The cathode metal such as Mg/Ag alloy and Li—Al binary system of ca. 200 nm is laminated on the top of the organic layers. The vacuum during the deposition is preferably less than 0.1333 Pa ($1 \times 10^{-3}$ Torr), more preferably less than $1.333 \times 10^{-3}$ Pa ($1 \times 10^{-5}$ Torr), more preferably less than $1.333 \times 10^{-4}$ Pa ($1 \times 10^{-6}$ Torr).

As anode usual anode materials which possess high work function such as metals like gold, silver, copper, aluminum, indium, iron, zinc, tin, chromium, titanium, vanadium, cobalt, nickel, lead, manganese, tungsten and the like, metallic alloys such as magnesium/copper, magnesium/silver, magnesium/aluminum, aluminum/indium and the like, semiconductors such as Si, Ge, GaAs and the like, metallic oxides such as indium-tin-oxide ("ITO"), ZnO and the like, metallic compounds such as CuI and the like, and furthermore, electroconducting polymers such polyacetylene, polyaniline, polythiophene, polypyrrole, polyparaphenylene and the like, preferably ITO, most preferably ITO on glass as substrate can be used. Of these electrode materials, metals, metallic alloys, metallic oxides and metallic compounds can be transformed into electrodes, for example, by means of the sputtering method. In the case of using a metal or a metallic alloy as a material for an electrode, the electrode can be formed also by the vacuum deposition method. In the case of using a metal or a metallic alloy as a material forming an electrode, the electrode can be formed, furthermore, by the chemical plating method (see for example, Handbook of Electrochemistry, pp 383–387, Mazuren, 1985). In the case of using an electroconducting polymer, an electrode can be made by forming it into a film by means of anodic oxidation polymerization method onto a substrate which is previously provided with an electroconducting coating. The thickness of an electrode to be formed on a substrate is not limited to a particular value, but, when the substrate is used as a light emitting plane, the thickness of the electrode is preferably within the range of from 1 nm to 100 nm, more preferably, within the range of from 5 to 50 nm so as to ensure transparency.

In a preferred embodiment ITO is used on a substrate having an ITO film thickness in the range of from 10 nm (100 Å) to 1μ (10000 Å), preferably from 20 nm (200 ) to 500 nm (5000 Å). Generally, the sheet resistance of the ITO film is chosen in the range of not more than 100 Ω/cm², preferred from not more than 50 Ω/cm².

Such anodes are commercially available e.g. from e.g. Japanese manufacturers such as Geomatech Co.Ltd., Sanyo Vacuum Co. Ltd., Nippon Sheet Glass Co. Ltd.

As substrate either an electroconducting or electrically insulating material can be used. In case of using an electroconducting substrate, a light emitting layer or a positive hole transporting layer is directly formed thereupon, while in case of using an electrically insulating substrate, an electrode is firstly formed thereupon and then a light emitting layer or a positive hole transporting layer is superposed.

The substrate may be either transparent, semi-transparent or opaque. However, in case of using a substrate as an indicating plane, the substrate must be transparent or semi-transparent.

Transparent electrically insulating substrates are, for example, inorganic compounds such as glass, quartz and the like, organic polymeric compounds such as polyethylene, polypropylene, polymethylmethacrylate, polyacrylonitrile, polyester, polycarbonate, polyvinylchloride, polyvinylalcohol, polyvinylacetate and the like. Each of these substrates can be transformed into a transparent electroconducting substrate by providing it with an electrode according to one of the methods described above.

As examples of semi-transparent electrically insulating substrates, there are inorganic compounds such as alumina, YSZ (yttrium stabilized zirconia) and the like, organic polymeric compounds such as polyethylene, polypropylene, polystyrene, epoxy resin and the like. Each of these substrates can be transformed into a semi-transparent electroconducting substrate by providing it with an electrode according to one of the abovementioned methods.

As examples of opaque electroconducting substrates, there are metals such as aluminum, indium, iron, nickel, zinc, tin, chromium, titanium, copper, silver, gold, platinum and the like, various elctroplated metals, metallic alloys such as bronze, stainless steel and the like, semiconductors such as Si, Ge, GaAs, and the like, electroconducting polymers such as polyaniline, polythiophene, polypyrrole, polyacetylene, polyparaphenylene and the like.

A substrate can be obtained by forming one of the above listed substrate materials to a desired dimension. It is preferred that the substrate has a smooth surface. Even if it has a rough surface, however, it will not cause any problem for practical use, provided that it has round unevenness having a curvature of not less than 20 µm. As for the thickness of the substrate, there is no restriction as far as it ensures sufficient mechanical strength.

As cathode usual cathode materials which possess low work function such as alkali metals, earth alkaline metals, group 13 elements, silver, and copper as well as alloys or mixtures thereof such as sodium, lithium, potassium, sodium-potassium alloy, magnesium, magnesium-silver alloy, magnesium-copper alloy, magnesium-aluminum alloy, magnesium-indium alloy, aluminum, aluminum-aluminum oxide alloy, aluminum-lithium alloy, indium, calcium, and materials exemplified in EP-A 499,011 such as electroconducting polymers e.g. polypyrrole, polythiophene, polyaniline, polyacetylene etc., preferably Mg/Ag alloys, or Li—Al compositions can be used.

In a preferred embodiment magnesium-silver alloy or a mixture of magnesium and silver mixture, or lithium-aluminum alloy or a mixture of lithium and aluminum can be used in a film thickness in the range of from 10 nm (100 Å) to 1 µm (10000 Å), preferably from 20 nm (200 Å) to 500 nm (5000 Å).

Such cathodes can be deposited on the foregoing electron transporting layer by known vacuum deposition techniques described above.

In a preferred ambodiment of this invention a light-emitting layer can be used between the hole transporting layer and the electron transporting layer. Usually it is prepared by forming a thin film of a maleimide of formula I on the hole transporting layer.

As methods for forming said thin film, there are, for example, the vacuum deposition method, the spin-coating method, the casting method, the Langmuir-Blodgett ("LB") method and the like. Among these methods, the vacuum deposition method, the spin-coating method and the casting method are particularly preferred in view of ease in operation and cost. In case of forming a thin film using a fluorescent maleimide I by means of the vacuum deposition method, the conditions under which the vacuum deposition is carried out are usually strongly dependent on the properties, shape and crystalline state of the compound. However, optimum conditions can be selected for example within the range of from 100 to 400° C. in temperature for the heating boat, −100 to 350° C. in substrate temperature, $1.33 \times 10^4$ Pa ($1 \times 10^2$ Torr) to $1.33 \times 10^{-4}$ Pa ($1 \times 10^{-6}$ Torr) in pressure and 1 pm to 6 nm/sec in deposition rate.

In an organic EL element, the thickness of the light emitting layer thereof is one of the factors determining its light emission properties. For example, if a light emitting layer is not sufficiently thick, a short circuit can occur quite easily between two electrodes sandwiching said light emitting layer, and therefor, no EL emission is obtained. On the other hand, if the light emitting layer is excessively thick, a large potential drop occurs inside the light emitting layer because of its high electrical resistance, so that the threshold voltage for EL emission increases. Accordingly, it is necessary to limit the thickness of an organic light emitting layer within the range of from 5 nm to 5 µm. A preferable thickness is within the range of from 10 nm to 500 nm.

In the case of forming a light emitting layer by using the spin-coating method and the casting method, the coating can be carried out using a solution prepared by dissolving the fluorescent maleimide I in a concentration of from 0.0001 to 90% by weight in an appropriate organic solvent such as benzene, toluene, xylene, tetrahydrofurane, methyltetrahydrofurane, N,N-dimethylformamide, dichloromethane, dimethylsulfoxide and the like. Herein, the higher the concentration of fluorescent maleimide I, the thicker the resulting film, while the lower the concentration, the thinner the resulting film. However, if the concentration exceeds 90% by weight, the solution usually is so viscous that it no longer permits forming a smooth and homogenous film. On the other hand, as a rule, if the concentration is less than 0.0001% by weight, the efficiency of forming a film is too low to be economical. Accordingly, a preferred concentration of the fluorescent maleimide I is within the range of from 0.01 to 80% by weight. In the case of using the above spin-coating or casting method, it is possible to further improve the homogeneity and mechanical strength of the resulting layer by adding a polymer binder in the solution for forming the light emitting layer. In principle, any polymer binder may be used, provided that it is soluble in a solvent in which the fluorescent maleimide I is dissolved. Examples of such polymer binders are polycarbonate, polyvinylalcohol, polymethacrylate, polymethylmethacrylate, polyester, polyvinylacetate, epoxy resin and the like. A solution for forming a light emitting layer may have any concentrations of the fluorescent maleimide I, of a polymer binder and solvent. However, if the solid content composed of the polymer binder and fluorescent maleimide I exceeds 99% by weight, the fluidity of the solution is usually so low that it is impossible to form a light emitting layer excellent in homogeneity. On the other hand, if the content of fluorescent maleimide I is substantially smaller than that of the polymer binder, in general the electrical resistance of said layer is very large, so that it does not emit light unless a high voltage is applied thereto. Furthermore, since the concentration of fluorescent maleimide I in the layer is small in this case, its light emission efficiency is relatively low. Accordingly, the preferred composition ratio of a polymer binder to fluorescent maleimide I is chosen within the range of from 10:1 to 1:50 by weight, and the solid content composed of both components in the solution is preferably within the range of from 0.01 to 80% by weight, and more preferably, within the range of about 0.1 to 60% by weight.

In the case of forming a light emitting layer by the spin-coating method or casting method, the thickness of said layer may be selected in the same manner as in the case of forming a light emitting layer by the vacuum deposition method. That is, the thickness of the layer preferably is chosen within the range of from 5 nm to 5 µm, and more preferably, within the range of from 10 nm to 500 nm.

As hole-transporting layers known organic hole transporting compounds such as polyvinyl carbazole,

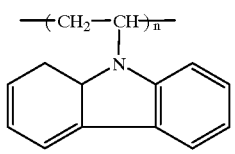

a triphenylamine derivative ("TPD") compound disclosed in J.Amer.Chem.Soc. 90 (1968) 3925

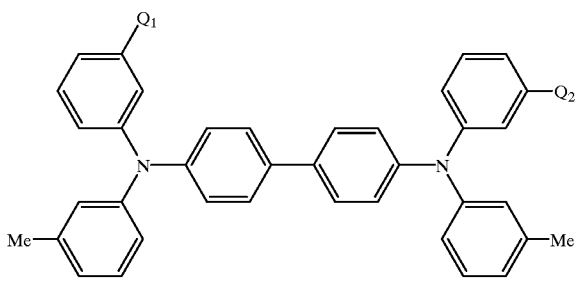

wherein $Q_1$ and $Q_2$ each represent a hydrogen atom or a methyl group;

a compound disclosed in J. Appl. Phys. 65(9) (1989) 3610

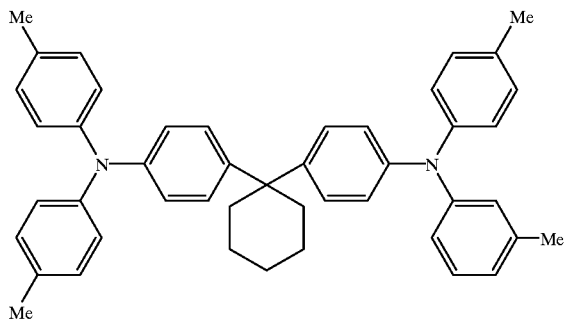

a stilbene based compound

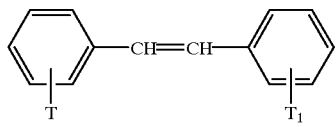

wherein T and $T_1$ stand for an organic rest a hydrazone based compound

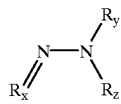

and the like.

Compounds to be used as a positive hole transporting material are not restricted to the above listed compounds. Any compound having a property of transporting positive holes can be used as a positive hole transporting material such as triazole derivatives, oxadiazole derivatives, imidazole derivatives, polyarylalkane derivatives, pyrazoline derivative, pyrazolone derivatives, phenylene diamine derivatives, arylamine derivatives, amino substituted chalcone derivatives, oxazole derivatives, stilbenylanthracene derivatives, fluorenone derivatives, hydrazone derivatives, stilbene derivatives, copolymers of aniline derivatives, electro-conductive oligomers, particularly thiophene oligomers, porphyrin compounds, aromatic tertiary amine compounds, stilbenyl amine compounds etc. Particularly, aromatic tertiary amine compounds such as N,N,N',N'-tetraphenyl-4,4'-diaminobiphenyl, N,N'-diphenyl-N,N'-bis(3-methylphenyl)-4,4'-diaminobiphenyl (TPD), 2,2'-bis(di-p-torylaminophenyl)propane, 1,1'-bis(4-di-torylaminophenyl)-4-phenylcyclohexane, bis(4-dimethylamino-2-methylphenyl)phenylmethane, bis(4-di-p-tolylaminophenyl)phenylmethane, N,N'-diphenyl-N,N'-di(4-methoxyphenyl)-4,4'-diaminobiphenyl, N,N,N',N'-tetraphenyl-4,4'-diaminodiphenylether, 4,4'-bis(diphenylamino)quaterphenyl, N,N,N-tri(p-tolyl)amine, 4-(di-p-tolylamino)-4'-[4-(di-p-tolylamino)stilyl]stilbene, 4-N,N-diphenylamino-(2-diphenylvinyl)benzene, 3-methoxy-4'-N,N-diphenylaminostilbene, N-phenylcarbazole etc.

Furthermore, 4,4'-bis[N-(1-naphtyl)-N-phenylamino] biphenyl disclosed in U.S. Pat. No. 5,061,569, the compounds in which three triphenylamine units are bound to a nitrogen atom like "star-burst" structure e.g. 4,4',4"-tris[N-(3-methylphenyl)-N-phenylamino]triphenylamine disclosed in EP-A 508,562.

A positive hole transporting layer can be formed by preparing an organic film containing at least one positive hole transporting material on the anode. The positive hole transporting layer can be formed by the vacuum deposition method, the spin-coating method, the casting method, the LB method and the like. Of these methods, the vacuum deposition method, the spin-coating method and the casting method are particularly preferred in view of ease and cost.

In the case of using the vacuum deposition method, the conditions for deposition may be chosen in the same manner as described for the formation of a light emitting layer (see above). If it is desired to form a positive hole transporting layer comprising more than one positive hole transporting material, the coevaporation method can be employed using the desired compounds.

In the case of forming a positive hole transporting layer by the spin-coating method or the casting method, the layer can be formed under the conditions described for the formation of the light emitting layer (see above).

As in the case of forming a light emitting layer using a solution containing a polymer binder, a smoother and more homogeneous positive hole transporting layer can be formed by using a solution containing a binder and at least one positive hole transporting material. The coating using such a solution can be performed in the same manner as in cases of forming a light emitting layer using a polymer binder. Any polymer binder may be used, provided that it is soluble in a solvent in which at least one positive hole transporting material is dissolved. Examples of appropriate polymer binders and of appropriate and preferred concentrations are given above when describing the formation of a light emitting layer.

The thickness of a positive hole transporting layer is preferably chosen in the range of from 0.5 to 1000 nm, preferably from 1 to 100 nm, more preferably from 2 to 50 nm.

As electron transporting materials for an electron-transporting layer it is preferred to have a high electron injection efficiency from the cathode and a high electron mobility. The following materials can be exemplified for electron transporting materials: tris(8-hydroxyquinolinoato) aluminum(III) and its derivatives, bis(10-hydroxybenzo[h] quinolinolato)beryllium(II) and its derivatives, oxadiazole derivatives such as 2-(4-biphenyl)-5-(4-tert.-butylphenyl)-1, 3,4-oxadiazole and its dimer systems such as 1,3-bis(4-tert.-butylphenyl-1,3,4)oxadiazolyl)-biphenylene and 1,3-bis(4-tert.-butylphenyl-1,3,4-oxadiazolyl)phenylene, triazole derivatives, phenanthroline derivatives or perylene tetracarboxylic acid derivatives such as disclosed in Appl. Phys. Lett. 48 (2) (1986) 183.

An electron transporting layer can be formed by preparing an organic film containing at least one electron transporting material on the hole transporting layer or on the light-emitting layer. The electron transporting layer can be formed by the vacuum deposition method, the spin-coating method, the casting method, the LB method and the like.

As in the case of forming a light emitting layer or a positive hole transporting layer by using a solution containing a polymer binder, a smoother and more homogeneous electron transporting layer can be formed by using a solution containing a binder and at least one electron transporting material.

The thickness of an electron transporting layer is preferably chosen in the range of from 0.5 nm to 1000 nm, preferably from 1 nm to 100 nm, more preferably from 2 to 50 nm.

Another embodiment relates to the use of the inventive compounds I and known compounds Ia as UV fluorescent materials for void detection. Especially preferred is the use for so-called OEM (original equipment manufacturer) applications such as automotive electrocoats and subsequent layers, for example primer surfacers, as well as industrial applications in general.

The present invention therefore relates to coating compositions comprising (a) an organic film-forming binder and (b) at least one compound of the formula I or Ia.

The coating composition is optionally solvent based, water based or solvent free.

Examples of coating materials are lacquers, paints, varnishes, powder coatings or electrocoats. These usually contain an organic film-forming binder in addition to other, optional components.

Preferred organic film-forming binders are epoxy resins, polyurethane resins, amino resins, acrylic resins, acrylic copolymer resins, polyvinyl resins, phenolic resins, urea resins, melamine resins, styrene/butadiene copolymer resins, vinyl/acrylic copolymer resins, polyester resins or alkyd resins, or a mixture of two or more of these resins, or an aqueous basic or acidic dispersion of these resins or mixtures of these resins, or an aqueous emulsion of these resins or mixtures of these resins, or hybrid systems based on, for example, epoxy acrylates.

More specifically, the alkyd resins can be water-dilutable alkyd resin systems which can be employed in air-drying form or in the form of stoving systems, optionally in combination with water-dilutable melamine resins; the systems may also be oxidatively drying, air-drying or stoving systems which are optionally employed in combination with aqueous dispersions based on acrylic resins or copolymers thereof, with vinyl acetates, etc.

The acrylic resins can be pure acrylic resins, epoxy acrylate hybrid systems, acrylic acid or acrylic ester copolymers, combinations with vinyl resins, or copolymers with vinyl monomers such as vinyl acetate, styrene or butadiene. These systems can be air-drying systems or stoving systems.

In combination with appropriate polyamine crosslinkers, water-dilutable epoxy resins exhibit excellent mechanical and chemical resistance. If liquid epoxy resins are used, the addition of organic solvents to aqueous systems can be omitted. The use of solid resins or solid-resin dispersions usually necessitates the addition of small amounts of solvent in order to improve film formation.

Preferred epoxy resins are those based on aromatic polyols, especially those based on bis-phenols. The epoxy resins are employed in combination with crosslinkers. The latter may in particular be amino- or hydroxy-functional compounds, an acid, an acid anhydride or a Lewis acid or a blocked isocyanate. Examples thereof are polyamines, polyaminoamides, polysulfide-based polymers, polyphenols, boron fluorides and their complex compounds, polycarboxylic acids, 1,2-dicarboxylic anhydrides, pyromellitic dianhydride, ot toluoyl di-iso-cyanates.

Polyurethane resins are derived from polyethers, polyesters and polybutadienes with terminal hydroxyl groups, on the one hand, and from aliphatic or aromatic polyisocyanates on the other hand.

Examples of suitable polyvinyl resins are polyvinylbutyral, polyvinyl acetate or copolymers thereof.

Suitable phenolic resins are synthetic resins in the course of whose construction phenols are the principal component, i.e. in particular phenol-, cresol-, xylenol- and resorcinol-form-aldehyde resins, alkylphenolic resins, and condensation products of phenols with acetaldehyde, furfurol, acrolein or other aldehydes. Modified phenolic resins are also of interest.

The coating compositions may additionally comprise one or more components taken, for example, from the group consisting of pigments, dyes, fillers, flow control agents, dispersants, thixotropic agents, adhesion promoters, antioxidants, light stabilizers and curing catalysts.

The pigments are, for example, titanium dioxide, iron oxide, aluminium bronze or phthalo-cyanine blue.

Examples of fillers are talc, alumina, aluminium silicate, barytes, mica, and silica.

Flow control agents and thixotropic agents are based, for example, on modified bentonites.

Adhesion promoters are based, for example, on modified silanes.

The claimed fluorescent compounds can be added to the coating material during its preparation, for example during pigment dispersion by grinding, or they are dissolved in a solvent and the solution is then stirred into the coating composition.

In the preparation of the organic film-forming binder by addition polymerization or condensation polymerization of monomers, the claimed fluorescent compounds can be mixed in in solid form, or dissolved, with the monomers even prior to the polymerization reaction.

The inventive maleimides I and other compounds of the formula Ia as well as compounds belonging to the group of dyestuffs exhibiting edge fluorescence are used in amounts of preferably 0.01% to 5% by weight, more preferably from 0.5 to 1.0% by weight, based on the total solids of the formulation containing no fluorescent agent.

The coating materials can be applied to the substrate by the customary techniques, for example by spraying, dipping, spreading or electrodeposition. In many cases, a plurality of coats are applied. The claimed maleimides I or the known compounds Ia as well as compounds belonging to the group of dyestuffs exhibiting edge fluorescence usually are added primarily to the base layer (primer), however, they can also be added to the intermediate coat, for example a primer surfacer, or topcoat, as well. Depending on whether the binder is a physically, chemically or oxidatively drying resin or a heat-curing or radiation-curing resin, the coating is cured at room temperature or by heating (stoving) or by irradiation.

Once the coating compositions are cured, the corresponding coatings can be inspected with the use of a UV-lamp. Defects or voids as a result of misapplication or artificially applied defects can be easily detected, because the used fluorescent compounds exhibit intense fluorescence only at the voids (so-called "edge fluorescence").

Hence, another preferred embodiment of this invention relates to a composition comprising a dyestuff exhibiting edge fluorescence.

A further preferred embodiment of this invention relates to a method of inspecting the surface of a body comprising the steps of:

(a) covering a surface with a composition comprising a compound exhibiting edge fluorescence, (b) inspecting the thus covered surface with ultraviolet light for visible light, such being indicative of faults in the surface.

Preferably, inspection is done using a high intensity black light (UV-A, 320–400 nm), preferably under low light conditions. A suitable lamp is available from Spectronics Corporation Inc. (Westbury, N.Y.).

Preferably, the edge fluorescence exhibiting compound is a maleimide of formulae I or Ia are used, most preferably 1,1'-(1,2-ethanediyl)bis[3,4-diphenyl]-1H-pyrrole-2,5-dione

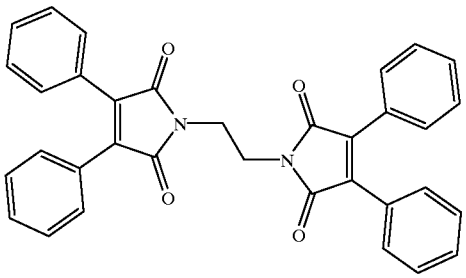

A further preferred embodiment relates to an article of manufacture comprising: a body having a surface to be covered; a layer of coating material on the surface of the body, fluorescing means blended with said coating material for emitting identifiable visible light in response to exposure to ultraviolet light.

Preferably, the fluorescing means is a compound of formula I or Ia, particularly preferred is 1,1'-(1,2-ethanediyl) bis[3,4-diphenyl]-1H-pyrrole-2,5-dione.

The claimed fluorescent compounds as well as the compositions allow easy quality assurance, instant possibility of repair, easy longer-term inspection. Further, compared to optical brighteners, a superior solubility is observed which makes an incorporation more easy. In addition, the claimed materials show fluorescence in the solid state, whereas optical brighteners must be soluble in the resin or polymer to exhibit fluorescence. The claimed compounds and compositions also show a superior photostability and none to less yellowing compared to optical brighteners upon UV-exposure, i.e. optical brighteners photochemically decompose under UV-light within less than 24 to 100 hours with formation of colored products leading to discoloration of e.g. white coatings. Also the claimed compounds and compositions migrate less than and contaminate the working environment less than optical brighteners. A big advantage is the exhibition of the so-called edge fluorescence meaning that fluorescence is observed only at voids and not at the whole surface which gives much better contrast compared to e.g. optical brighteners and allows also the detection of minor defects or damages. Too, the inventive compounds and composition have no or only minimal impact on the paint color in comparison to dyes, i.e. they can be even used in white pigmented systems. Further, the inventive materials are useful in dark and white pigmented systems where optical brighteners fail, i.e. in dark pigmented systems fluorescence and subsequently voids are difficult to detect in known systems, in white pigmented systems fluorescence is too intense (whole surface) which in turn makes it very difficult to identify voids in systems of the prior art. Finally, the found superior photostability of the inventive materials compared to optical brighteners allows long-term void detection, i.e. inspection after months or years after the application. Particularly, 1,1'-(1,2-ethanediyl)bis[3,4-diphenyl]-1H-pyrrole-2,5-dione is suitable for detecting defects such as craters (voids) and poor coverage: an unique edge fluorescence phenomenon is shown when a cured coating is scratched. The technique also works over uneven surfaces, e.g. weld seams.

EXAMPLES (A) Preparation of Diarylmaleic Anhydrides

Example 1

(a) To 301 g (2.26 mol) of $AlCl_3$ in $CH_2Cl_2$ (750 ml) a mixture of 383 g (2.25 mol) of 4-phenoxybenzene and 205 g (1.50 mol) of ethyl chloroglyoxylate in $CH_2Cl_2$ (750 ml) is added dropwise at ice-bath temperature during one hour. Thereafter, the mixture is gradually warmed up to room temperature and stirred overnight. Then, the reaction mixture is poured onto ice. The aq. solution is acidified to pH 3 with aqueous HCl solution, followed by an extraction with $CH_2Cl_2$. The extract is dried over anhydrous $MgSO_4$. The desired product is purified by silica gel column chromatography using $CH_2Cl_2$-hexane mixture as eluent. 338 g of colorless oily 4-phenoxyphenyl glyoxylic acid ethyl ester is obtained (83%).

(b) 338 g (1.25 mol) of the above obtained product is treated with 60.4 g (1.45 mol) of NaOH (96%) in 1 l of water and 1 of EtOH under reflux for 2 h. The mixture is then acidified to pH 3, and then 4-phenoxyphenyl glyoxylic acid is extracted with $CH_2Cl_2$. 310 g of oil is obtained as a crude product. This product is used for next the below reaction without further purification.

(c) To 167 g of 4-phenoxyphenyl glyoxylic acid 160 ml (3.30 mol) of hydrazine monohydrate are carefully added through a condenser under reflux over 45 min. After cooling the reaction mixture to 100° C., 176 g (2.68 mol) of KOH (85% in water) are carefully added over 45 min., and then the reaction mixture is heated to reflux for 45 min. Excess hydrazine is removed by distillation, and the mixture is acidified with diluted aqueous HCl to pH 3, followed by an extraction with $CH_2Cl_2$. The desired 4-phenoxyphenyl acetic acid is purified by repeated crystallization from hot hexane. 122 g of white solid are obtained (80%).

(d) 142 g (582 mmol) of 4-phenoxyphenyl glyoxylic acid are treated with 68.6 g (612 mmol) of tert.-BuOK in MeOH to obtain the corresponding potassium salt. The obtained white solid is then filtered, followed by washing with MeOH. 162 g of white solid are obtained. 150 g (535 mmol) of this white solid are mixed with 120 g (525 mmol) of 4-phenoxyphenyl acetic acid in 1 l of acetic anhydride and heated to reflux for two hours. After removal of acetic anhydride by evaporation in an atmosphere under reduced pressure, the obtained yellow solid is washed with acetone and ethyl acetate affording 217 g of yellow solid 3,4-di(4-phenoxyphenyl) maleic anhydride (93%).

Examples 2a–13a

Example 1a is repeated with the differences mentioned in the below Table 1:

TABLE 1

| ex. | $AlCl_3$ [g] | in $CH_2Cl_2$ [ml] | $R_{18}$-H | amount [g] | ethyl chloro-glyoxylate [g] | in $CH_2Cl_2$ [ml] | treatment in ice-bath [h] | stirring after warming to r.t. [h] | yield [%] |
|---|---|---|---|---|---|---|---|---|---|
| 2a | 68.4 | 300 | 3-dibenzofurane | 51.2 | 45.0 | 400 | 1 | 2 | 89 |
| 3a | 67.3 | 200 | 4-methoxybenzene | 43.4 | 60.1 | 200 | 1 | 1 | 82 |
| 4a | 15.0 | 100 | 4-phenylthiobenzene | 18.6 | 14.3 | 150 | ½ | ⅔ | 76 |
| 5a | 14.9 | 300 | 3,4-dimethoxybenzene | 13.8 | 14.3 | 150 | ½ | ⅔ | 33 |
| 6a[1)] | 23.0 | 60 | 4-dimethylaminobenzene | 12.2 | 15.0 | 60 | ⅙ | 12 | 44 |
| 7a[2)] | 45.0 | 200 | 4-diphenylaminobenzene | 76.5 | 42.6 | 200 | ⅔ | 2½ | 47 |
| 8a | 20.5 | 150 | 3-(N-ethyl)-carbazole | 19.5 | 14.4 | 150 | ¼ | 2 | 72 |
| 9a | 23.44 | 60 | 1-naphthaline | 12.8 | 15.0 | 60 | 1½ | 12 | 92 |
| 10a | 37.3 | 100 | 4-methoxy-1-naphthaline | 25.5 | 23.9 | 100 | 5/12 | 7/12 | 95 |
| 11a | 22.1 | 100 | 4-morpholinobenzene | 24.5 | 21.5 | 100 | 3 | 12 | 43 |
| 12a | 27.4 | 60 | 1-pyrene | 24.3 | 18.1 | 60 | 5/12 | 12 | 83 |
| 13a | 13.6 | 35 | 9-anthrene | 10.8 | 9.10 | 65 | ⅙ | 12 | 84 |

Example 14a

To 8.56 g (60.2 mmol) of 3,4-ethylenedioxy-2-thiophene in tetrahydrofurane ("THF") (50 ml) 40 ml of 1.6 M n-BuLi hexane solution (64 mmol) are added dropwise at −100° C. over 10 min. The obtained solution is added to 17.6 g (121 mmol) of diethyl oxalate in THF (50 ml) at −100° C. through a canula during two hours. After completion of the addition, the obtained mixture is gradually warmed up to room temperature and stirred for four hours. Then, an aqueous $NH_4Cl$ solution is added to this reaction mixture. After removal of THF and hexane, the product is extracted with $CH_2Cl_2$. The extract is dried over anhydrous $MgSO_4$. Then, the desired product is purified by silica gel column chromatography using $CH_2Cl_2$-hexane mixture as eluent. 12.2 g of yellow solid 3,4-ethylenedioxy-2-thienyl glyoxylic acid ethyl ester are obtained (84%).

Example 15a

To 10.1 9 (48.8 mmol) of naphthalene in 200 ml THF 65 ml of 1.6 M n-BuLi hexane solution (104 mmol) are added dropwise at −100° C. during 20 min. The obtained solution is added to 30 ml (221 mmol) of diethyl oxalate during 5 min. After completion of the addition, the obtained mixture is gradually warmed up to room temperature and stirred for 17.5 hours. Then, water is added to this reaction mixture. After removal of THF and hexane, the product is extracted with $CH_2Cl_2$. The extract is dried over anhydrous $MgSO_4$. Then, the desired product is purified by silica gel column chromatography using $CH_2Cl_2$-hexane mixture as eluent. 3.76 9 of yellow oil 2-naphthyl glyoxylic acid ethyl ester as a mixture together with diethyl oxalate. A $^1$H-NMR-spectrum of the mixture indicated the presence of the desired product with 56.4% in the mixture (19. 1% yield). The mixture is used for the next reaction step (example 15b) without any further purification.

Examples 2b to 16b example 1 b is repeated, however, the reaction parameters of Table 2 are used (ex. 16b, 4-acetylaminophenyl glyoxylic acid ethyl ester, is prepared according to the method described in J. Org. Chem., 1981, 46, 134)

TABLE 2

| ex. | ester VIII $R_{18}$ ($R_{20}$ = ethyl) | amount [g] | NaOH [g] | water [ml] | EtOH [ml] | duration of reflux [h] | workup | yield [%] |
|---|---|---|---|---|---|---|---|---|
| 2b | 3-dibenzofuryanyl | 71.6 | 12.4 | 200 | 200 | 3 | A | 83 |
| 3b | 4-methoxyphenyl | 53.0 | 12.2 | 250 | 250 | 1 | B | 93 |
| 4b | 4-phenylthiophenyl | 20.6 | 3.29 | 70 | 70 | 4 | C | 63 |
| 5b | 3,4-dimethoxyphenyl | 7.58 | 1.51 | 30 | 30 | 1 | D | 90 |
| 6b | 4-dimethylaminophenyl | 9.58 | 2.63 | 50 | 50 | 5 | E | 56 |
| 7b | 4-diphenylaminophenyl | 50.6 | 6.76 | 150 | 150 | 2 | D | 95 |
| 8b | 3-(N-ethyl)-carbazole | 20.9 | 3.29 | 70 | 70 | 3 | D | 100 |
| 9b | 1-naphthyl | 20.9 | 5.85 | 100 | 100 | 3½ | D | 95 |
| 10b | 4-methoxy-1-naphthyl | 39.3 | 6.98 | 150 | 150 | 2 | F | 91 |
| 11b | 4-morpholinophenyl | 16.7 | 2.96 | 60 | 60 | 1½ | G | 93 |
| 12b | 1-pyrenyl | 29.7 | 4.51 | 100 | 100 | 4 | H | 62 |
| 13b | 9-anthryl | 13.6 | 2.29 | 60 | 60 | 1 | I | 99 |
| 14b | 3,4-ethylenedioxy-2-thienyl | 12.0 | 2.17 | 50 | 50 | 4 | J | 89 |
| 15b | 2-naphthyl | 3.76 | 1.49 | 40 | 40 | 2 | K | 90 |

Workup

A: The mixture is acidified to pH 3, and then the product is collected by filtration and subsequent washing with water and then $CH_2Cl_2$.

B: The mixture is acidified to pH 3, and then the product is collected by filtration and subsequent washing with water.

C: The mixture is acidified to pH 3, and then the product is extracted with $CH_2Cl_2$. The extract is dried over anhydrous $MgSO_4$. The desired product is purified by silica gel column chromatography using $CH_2Cl_2$-MeOH mixture as eluent. 11.6 g of a brown oil are obtained.

D: The mixture is acidified to pH 3, and then the product is extracted with $CH_2Cl_2$. After removal of $CH_2Cl_2$, washing with hexane affords 11.6 g of a white solid.

E: After acidifying the mixture, the resulting solid is filtered off, followed by washing with water and acetone. The desired product is purified by silica gel column chromatography using $CH_2Cl_2$-MeOH mixture as eluent. 4.65 g of a yellow solid are obtained.

F: The mixture is acidified, and then the product is extracted with $CH_2Cl_2$. The extract is dried over anhydrous $MgSO_4$. After removal of the solvent, 32.0 g of a pale yellow solid are obtained.

G: The mixture is acidified to pH 3, and then the resulting white solid is filtered, followed by washing with water and acetone. 15.1 g of a white solid are obtained as a crude product. This product is used for the next reaction step without further purification.

H: The mixture is acidified to pH 3, and then the resulting white solid is filtered, followed by washing with water, acetone, and $CH_2Cl_2$. 16.8 g of a yellow solid are obtained as a crude product. This product is used for the next reaction step without further purification.

I: The mixture is acidified, and then the product is extracted with $CH_2Cl_2$. The extract is dried over anhydrous $MgSO_4$. After removal of the solvent, 12.1 g of an orange solid are obtained.

J: The mixture is acidified, and then the resulting solid is filtered, followed by washing with water and a small portion of $CH_2Cl_2$. 9.47 g of a yellow solid are obtained.

K: The mixture is acidified, and then the product is extracted with $CH_2Cl_2$. The desired acid is purified by silica gel column chromatography using $CH_2Cl_2$-MeOH mixture as eluent. 1.94 g of a yellow solid are obtained.

Examples 2c to 15c, and 19c:

example 1 c is repeated, however, the educts and reaction parameters of Table 3 are used (2-(4- methoxyphenyl)-acetic acid (corresponding to ex. 3c), 2-(3,4-dimethoxyphenyl)-acetic acid (corresponding to ex. 5c), 2-(4-diphenylaminophenyl)-acetic acid (corresponding to ex. 6c), 2-(1-naphthyl)-acetic acid (corresponding to ex. 9c), 2-(2-naphthyl)-acetic acid (corresponding to ex. 15c) and chloropheylacetic acid (corresponding to ex. 19c) are commercially available):

purified by silica gel column chromatography using a $CH_2Cl_2$-acetone mixture as eluent.

C: Excess hydrazine is removed by distillation, and then the mixture is acidified with diluted HCl. The product is then extracted with $CH_2Cl_2$. Then, $CH_2Cl_2$ is removed by distillation.

C1: 9.18 g of a brownish solid are obtained as a crude product. This product is used for the next reaction step without further purification.

C2: 13.8 g of a white solid are obtained.

Example 2d 13.6 g (56.7 mmol) of the product obtained in ex. 2b are treated with 6.70 g (59.7 mmol) of tert.-BuOK in MeOH to obtain the corresponding potassium salt, and then the solvent is removed by evaporation. After drying under an atmosphere of reduced pressure, the obtained solid is mixed with 12.8 g (56.7 mmol) of the product obtained in ex. 2c and 110 ml of acetic anhydride and thereafter heated to reflux for one hour. After removal of acetic anhydride by evaporation under an atmosphere of reduced pressure, the resulting yellow solid is washed with acetone, affording 11.0 g (45%) of a yellow solid.

Example 3d 41.8 g (232 mmol) of the product obtained in ex. 3b are treated with 27.7 g (247 mmol) of tert.-BuOK in MeOH to obtain the corresponding potassium salt, and then the solvent is removed by evaporation. After drying under an atmosphere of reduced pressure, the obtained solid is mixed with 39.5 g (235 mmol) of p-methoxyphenylacetic acid (commercially available, corr. to ex. 3c, 99% purity) in 460 ml of acetic anhydride and then heated to reflux for 1.5 hours. Thereafter, acetic anhydride is removed by evaporation in an atmosphere of reduced pressure. The resulting solid is then washed with a hexane-acetone mixture, affording 74.3 g of an orange solid (100%).

Example 4d 4.44 g (17.2 mmol) of the product obtained in ex. 2b are treated with 2.03 g (18.0 mmol) of tert.-BuOK in MeOH to

TABLE 3

| ex. | acid VI $R_{18}$ | amount [g] | $H_2NNH_2.H_2O$ [ml] | duration of reflux [min] | KOH [g] | duration of relux [h] | workup | yield [%] |
|---|---|---|---|---|---|---|---|---|
| 2c | 3-dibenzofuryanyl | 24.1 | 35 | 20 | 26.5 | 3 | A | 57 |
| 4c | 4-phenylthiophenyl | 6.31 | 9 | 30 | 7.06 | 4 | A | 89 |
| 7c | 4-diphenylaminophenyl | 25.3 | 35 | 90 | 21.1 | 2 | B | 94 |
| 8c | 3-(N-ethyl)-carbazole | 9.41 | 12.5 | 60 | 9.83 | 2½ | C + C1 | 90 |
| 10c | 4-methoxy-1-naphthyl | 15.1 | 23 | 30 | 17.4 | 1 | C + C2 | 97 |
| 11c | 4-morpholinophenyl | 8.00 | 15 | 90 | 8.82 | 1 | A | 65 |
| 12c | 1-pyrenyl | 8.79 | 7.8[1] | 90 | 8.44[2] | 2 | B | 23 |
| 14c | 3,4-ethylenedioxy-2-thienyl | 5.48 | 9.0 | 60 | 7.18 | 2 | A | 76 |

[1]+ 10 ml $H_2O$; 2) + 10 ml $H_2O$

Workup

A: Excess hydrazine is removed by distillation, and then the mixture is acidified with diluted HCl to pH 3. The product is then extracted with $CH_2C_{12}$. The desired acid is purified by silica gel column chromatography using a $CH_2Cl_2$-MeOH mixture as eluent.

B: Excess hydrazine is removed by distillation, and then the mixture is acidified with diluted HCl. The product is then extracted with $CH_2Cl_2$. The desired acid is obtain the corresponding potassium salt, then the solvent is removed by evaporation. After drying the residue under an atmosphere of reduced pressure, the obtained solid is mixed with 4.20 g (17.2 mmol) of the product obtained in ex. 4c in 35 ml of acetic anhydride and heated to reflux for 1.5 hours. After removal of acetic anhydride by evaporation in an atmosphere of reduced pressure, the resulting solid is washed with MeOH. The desired product is purified by silica gel column chromatography using $CH_2Cl_2$-hexane mixture as eluent. 3.38 g of a yellow solid are obtained (42%).

Example 5d 4.22 g (20.1 mmol) of the product obtained in ex. 5b are treated with 2.37 g (21.1 mmol) of tert.-BuOK in MeOH to obtain the corresponding potassium salt, then the solvent is removed by evaporation. After drying the residue under an atmosphere of reduced pressure, the obtained solid is mixed with 3.95 g (20.1 mmol) of homoveratric acid (commercially available, corresponding to ex. 5c) in 40 ml of acetic anhydride and heated to reflux for 3.5 hours. After removal of acetic anhydride by evaporation in an atmosphere of reduced pressure, the desired product is purified by silica gel column chromatography using $CH_2Cl_2$ as eluent. 3.23 g of an orange solid are obtained (44%).

Example 6d 1.97 g (10.2 mmol) of the product obtained in ex. 6b are treated with 1.23 g (11.0 mmol) of tert.-BuOK in MeOH to obtain the corresponding potassium salt, then the solvent is removed by evaporation. After drying under an atmosphere of reduced pressure, the obtained solid is mixed with 1.91 g (10.3 mmol) of p-dimethylaminophenylacetic acid (commercially available, corr. to ex. 6c) in 20 ml of acetic anhydride and heated to reflux for 1.5 hours. After removal of acetic anhydride by evaporation in an atmosphere of reduced pressure, the desired product is purified by silica gel column chromatography using hexane-$CH_2Cl_2$ mixture as eluent. 1.39 g of a dark red solid are obtained (41%).

Example 7d 18.9 g (59.4 mmol) of the product obtained in ex. 7b are treated with 7.00 g (62.4 mmol) of tert.-BuOK in MeOH to obtain the corresponding potassium salt, then the solvent is removed by evaporation. After drying the residue under an atmosphere of reduced pressure, the obtained solid is mixed with 18.1 g (59.7 mmol) of the product obtained in ex. 7c in 120 ml of acetic anhydride and heated to reflux for 1.5 hours. After removal of acetic anhydride by evaporation in an atmosphere of reduced pressure, the resulting solid is washed with acetone. 24.3 g of a dark red solid are obtained (70%).

Example 8d 8.40 g (31.4 mmol) of the product obtained in ex. 8b are treated with 3.73 g (33.3 mmol) of tert.-BuOK in MeOH to obtain the corresponding potassium salt, then the solvent is removed by evaporation. After drying under an atmosphere of reduced pressure, the obtained solid is mixed with 8.00 g (31.6 mmol) of the product obtained in ex. 8c in 60 ml of acetic anhydride and heated to reflux for 7 hours. After removal of acetic anhydride by evaporation in an atmosphere of reduced pressure, the resulting solid is dissolved in $CH_2Cl_2$, and then purified by silica gel column chromatography using $CH_2Cl_2$-hexane mixture as eluent. 7.92 g of a red solid are obtained (52%). by silica gel column chromatography using hexane-ethyl acetate mixture as eluent. 20.9 g of slightly brownish oil is obtained (92%).

Example 9d 10.3 g (51.5 mmol) of the product obtained in ex. 9b are treated with 6.04 g (53.8 mmol) of tert.-BuOK in MeOH to obtain the corresponding potassium salt, then the solvent is removed by evaporation. After drying the obtained residue under an atmosphere of reduced pressure, the obtained solid is mixed with 9.36 g (50.3 mmol) of 1-naphthylacetic acid (commercially available, corr. to ex. 9c) in 100 ml of acetic anhydride and heated to reflux for 14 hours. After removal of acetic anhydride by evaporation under an atmosphere of reduced pressure, the resulting solid is dissolved in $CH_2Cl_2$. This mixture then is treated using silica gel column chromatography with a $CH_2Cl_2$-hexane mixture as eluent to obtain 5.47 g of a yellow solid (31%)

Example 10d 14.6 g (63.3 mmol) of the product obtained in ex. 10b are treated with 7.36 g (65.6 mmol) of tert.-BuOK in MeOH to obtain the corresponding potassium salt, then the solvent is removed by evaporation. After drying the obtained residue under an atmosphere of reduced pressure, the obtained solid is mixed with 13.6 g (62.9 mmol) of the product obtained in ex. 10c in 130 ml of acetic anhydride and heated to reflux for 2 hours. After removal of acetic anhydride by evaporation under an atmosphere of reduced pressure, the resulting solid is dissolved in $CH_2Cl_2$. This mixture then is treated using silica gel column chromatography with a hexane-ethyl acetate mixture as eluent to obtain 16.4 g of a brownish orange solid (63%).

Example 11d 4.95 g (20.8 mmol) of the product obtained in ex. 11b are treated with 2.49 g (22.2 mmol) of tert.-BuOK in MeOH to obtain the corresponding potassium salt, then the solvent is removed by evaporation. After drying the obtained residue under an atmosphere of reduced pressure, the obtained white solid is mixed with 4.61 g (20.8 mmol) of the product obtained in ex. 11c in 40 ml of acetic anhydride and heated to reflux for 1.5 hours. After removal of acetic anhydride by evaporation under an atmosphere of reduced pressure, the resulting yellow solid is washed with acetone and then dissolved in $CH_2Cl_2$. This mixture then is treated using silica gel column chromatography with a $CH_2Cl_2$-acetone mixture as eluent to obtain 6.41 g of a yellow solid (74%).

Example 12d 1.66 g (6.05 mmol) of the product obtained in ex. 12b are treated with 716 mg (6.38 mmol) of tert.-BuOK in MeOH to obtain the corresponding potassium salt, then the solvent is removed by evaporation. After drying the thus obtained residue under an atmosphere of reduced pressure, the obtained solid is mixed with 1.56 g (6.00 mmol) of the product obtained in ex. 12c in 12 ml of acetic anhydride and heated to reflux for 1.5 hours. After removal of acetic anhydride by evaporation under an atmosphere of reduced pressure, the resulting red solid is washed with acetone, thereafter extracted with hot $CHCl_3$ using a Soxhlet extractor. 2.13 g of a red solid are obtained (71%).

Example 13d 2.51 g (10.0 mmol) of the product obtained in ex. 13b are treated with 1.17 g (10.4 mmol) of tert.-BuOK in MeOH to obtain the corresponding potassium salt, then the solvent is removed by evaporation. After drying the thus obtained residue under an atmosphere of reduced pressure, the obtained solid is mixed with 1.70 g (10.1 mmol) of p-methoxyphenylacetic acid (commercially available, corr. to ex. 3d) in 20 ml of acetic anhydride and heated to reflux for 2 hours. After removal of acetic anhydride by evaporation under an atmosphere of reduced pressure, the resulting solid is then dissolved in $CH_2Cl_2$. This mixture then is treated using silica gel column chromatography with a hexane-ethyl acetate mixture as eluent to obtain 160 mg of a red solid (4.2%).

Example 14d 3.58 g (16.7 mmol) of the product obtained in ex. 14b are treated with 1.90 g (16.9 mmol) of tert.-BuOK in MeOH to obtain the corresponding potassium salt, then the solvent is removed by evaporation. After drying the obtained residue under an atmosphere of reduced pressure, the obtained solid is mixed with 3.33 g (16.6 mmol) of the product obtained in ex. 14c in 30 ml of acetic anhydride and heated to reflux for 3 hours. After removal of acetic anhydride by evaporation under an atmosphere of reduced pressure, the resulting solid is dissolved in $CH_2Cl_2$. This mixture is treated using silica gel column chromatography with a $CH_2Cl_2$-hexane mixture as eluent to obtain 1.72 g of a brown solid (27%).

Example 15d 1.80 g (8.62 mmol) of the product obtained in ex. 15 b are treated with 1.06 g (9.46 mmol) of tert.-BuOK in MeOH to obtain the corresponding potassium salt, then the solvent is removed by evaporation. After drying the thus obtained residue under an atmosphere of reduced pressure, the obtained solid is mixed with 1.61 g (8.64 mmol) of 2-naphthylacetic acid (commercially available, corr. to ex. 15c) in 20 ml of acetic anhydride and heated to reflux for 3 hours. After removal of acetic anhydride by evaporation under an atmosphere of reduced pressure, the resulting solid is dissolved in $CH_2Cl_2$. This mixture then is treated using silica gel column chromatography with a $CH_2Cl_2$-hexane mixture as eluent to obtain 0.36 g of a yellow solid (12%).

Example 16d 4.51 g (29.8 mmol) of 4-acetylaminophenyl glyoxylic acid (commercially available) are treated with 3.46 g (30.8 mmol) of tert.-BuOK in MeOH to obtain the corresponding potassium salt, then the solvent is removed by evaporation. After drying the residue under an atmosphere of reduced pressure, the obtained solid is mixed with 4.51 g (29.8 mmol) of p-aminophenylacetic acid in 60 ml of acetic anhydride and heated to reflux for two hours. After removal of acetic anhydride by evaporation in an atmosphere of reduced pressure, the desired product is purified by silica gel column chromatography using $CH_2Cl_2$-acetone mixture as eluent, obtaining 0.56 g of a yellow-orange solid (5.3%).

Example 17d 2.81 g (10.0 mmol) of the potassium salt (obtained by: 2.44 g (10 mmol) of the product obtained in ex. 1 b are treated with 1.23 g (11 mmol) of tert.-BuOK in MeOH) of the product obtained in ex. lb are mixed with 1.82 g (9.82 mmol) of p-dimethylaminophenylacetic acid (commercially available, corr. to ex. 6c) in 20 ml of acetic anhydride and heated to reflux for 2 hours. After removal of acetic anhydride by evaporation under an atmosphere of reduced pressure, the resulting yellow solid is washed with a $CH_2Cl_2$-hexane mixture, which afforded 3.18 g of a dark red solid (84%).

Example 18d 4.25 g (15.2 mmol) of potassium salt (obtained by: 3.71 g (15.2 mmol) of the product obtained in ex. lb are treated with 1.85 g (16.5 mmol) of tert.-BuOK in MeOH) of the product obtained in ex. lb are mixed with 4.60 g (15.2 mmol) of the product obtained in ex. 7c in 30 ml of acetic anhydride and heated to reflux for 1.5 hours. After removal of acetic anhydride by evaporation under an atmosphere of reduced pressure, the thus obtained resulting solid is dissolved in $CH_2Cl_2$. This mixture, then, is treated using silica gel column chromatography with a hexane-$CH_2Cl_2$ mixture as eluent. 6.12 g of a dark red solid are obtained (79%).

Example 19d 9.85 g (30.1 mmol) of the product obtained in ex. 7b (97% pure) are treated with 3.53 g (31.5 mmol) of tert.-BuOK in MeOH to obtain the corresponding potassium salt, then the solvent is removed by evaporation. After drying the thus obtained residue under an atmosphere of reduced pressure, the obtained solid is mixed with 5.40 g (31.7 mmol) of p-chlorophenylacetic acid (commercially available, corr. to 19c) in 60 ml of acetic anhydride and heated to reflux for 1.5 hours. After removal of acetic anhydride by evaporation under an atmosphere of reduced pressure, the resulting solid is dissolved in $CH_2Cl_2$. This mixture is treated using silica gel column chromatography with a hexane-$CH_2Cl_2$ mixture as eluent to obtain 9.54 g of a dark red solid (70%).

Example 20d 6.97 g (22.0 mmol) of the product obtained in ex. 7b (97% pure) are treated with 2.62 g (23.4 mmol) of tert.-BuOK in MeOH to obtain the corresponding potassium salt, then the solvent is removed by evaporation. After drying the thus obtained residue under an atmosphere of reduced pressure, the obtained solid is mixed with 4.70 g (21.7 mmol) of the product obtained in ex. 10c in 45 ml of acetic anhydride and heated to reflux for 2 hours. After removal of acetic anhydride by evaporation under an atmosphere of reduced pressure, the resulting solid is dissolved in $CH_2Cl_2$. This mixture then is treated using silica gel column chromatography with a hexane-$CH_2Cl_2$ mixture as eluent to obtain 6.52 g of a red solid (60%).

Example 21d 8.30 g (28.0 mmol) of the potassium salt (obtained by: 8.0 g (28 mmol) of the product obtained in ex. 4b are treated with 3.45 g (30.8 mmol) of tert.-BuOK in MeOH) of the product obtained in ex. 4b are mixed with 6.04 g (27.9 mmol) of the product obtained in ex. 10 c in 60 ml of acetic anhydride and heated to reflux for 2 hours. After removal of acetic anhydride by evaporation under an atmosphere of reduced pressure, the resulting solid is dissolved in $CH_2Cl_2$. This mixture is treated using silica gel column chromatography with a hexane-$CH_2Cl_2$ mixture as eluent to obtain 7.56 g of a red solid (62%).

(B) Preparation of N-alkyldiarylmaleimides

General 4 mmol of the corresponding diarylmaleic anhydride of formula V and an excess (>4 mmol per each amino group) of the corresponding amine are heated to reflux in 20 ml of a mixture of toluene-DMF (3:1) for several hours. After removal of the solvents in an atmosphere under reduced pressure, the product is purified by column chromatography (silica gel with $CH_2Cl_2$-hexane as eluent).

Example 22

A mixture of 20.02 g (80 mmol) of diphenylmaleic anhydride and 2.4 g (40 mmol) of 1,2-ethlenediamine in toluene-DMF (1:1, 300 ml) is heated to reflux for 4 hours. After removal of the solvent mixture in an atmosphere under reduced pressure, the obtained crude solid is washed twice with each 100 ml of acetone. After drying, 19.72 g (94%) of a lemon yellow solid are obtained.

Example 23

4.4 g (10 mmol) of the product obtained in example 1d are treated with 310 mg of 1,2-ethlenediamine (5.2 mmol) in toluene-DMF (3:1, 50 ml) and heated under reflux for 6 hours. After removal of the solvents in an atmosphere under reduced pressure, the desired product is purified by column chromatography (silica gel, $CH_2Cl_2$-haxane mixture as eluent).

TABLE 4 compounds of formula IV ($R_{13} = R_{14} = R_{16} = R_{17}$)

| example | $R_{13}$ | $R_{15}$ | Yield (%) | Colour | Mp. (° C.) |
|---|---|---|---|---|---|
| 22 | phenyl | 1,2-ethylene | 94 | lemon-yellow | >250 |
| 23 | 4-phenoxyphenyl | 1,2-ethylene | 92 | Yellow | 115.2–117.0 |

Example 24

4.4 g (10 mmol) of the product obtained in example 1d are treated with 6.0 g of 1,2-ethlenediamine (100 mmol) in toluene-DMF (3:1, 50 ml) and heated to reflux for 3 hours. After removal of the solvents in an atmosphere under reduced pressure, a yellowish-orange product is collected by column chromatography (silica gel, ethylacetate as eluent). This compound is treated with 1 ml acetic anhydride in 10 ml toluene at room temperature for 23 hours. The desired product is purified by column chromatography (silica gel, ethylacetate/hexane mixture as eluent).

Example 25

4.1 mmol of 3,4-diphenoxyphenyl maleic anhydride (from example 1d) and 41 of $AcONH_4$ are heated to reflux in acetic acid (20 ml) overnight. After condensation of the reaction mixture, the resulting solid is filtered and washed with $H_2O$ and MeOH. The is purified by column chromatography (silica gel, $CH_2Cl_2$ as eluent).

Example 26–28

Example 25 is repeated, however, in example 26 3,4-di (4-diphenylaminophenyl) maleic anhydride, in example 27 3,4-di(4-methoxy-1-naphthyl) maleic anhydride, and in example 28 3,4-diphenyl maleic anhydride are used.

TABLE 5 compounds of formula II

| Example | $R_9$ | $R_{10}$ | Yield (%) | Colour | Mp. (° C.) |
|---|---|---|---|---|---|
| 25 | 4-phenoxyphenyl | H | 96 | Yellow | 242.5–244.8 |
| 26 | 4-diphenylaminophenyl | H | 68 | Dark Red | 244.3–246.5 |
| 27 | 4-methoxy-1-naphthyl | H | 77 | Orange | 239.6–242.1 |
| 28 | phenyl | H | 91 | Pale Yellow | 217.5–218.4 |

Example 29

460 mg (1.1 mmol) of the product obtained in ex. 25 are treated with 47 mg of NaH 1.2 mmol) in 5 ml of DMF at room temperature for 20 min. Into this reaction mixture 1,3-dibromopropane (1.0 ml, 9.9 mmol) are added and the mixture is stirred for one day at room temperature. After adding 20 ml of $H_2O$, the reaction mixture is extracted with $CH_2Cl_2$. The combined $CH_2Cl_2$-extracts are treated using column chromatography (silica gel, $CH_2Cl_2$-hexane mixture as eluent).

Example 30

949 mg of 1-pyrenemethanol (4.00 mmol) is treated with 2.0 g (6.0 mmol) $CBr_4$ and 27 g (4.9 mmol) $PPh_3$ in 40 ml $CH_2Cl_2$ at room temperature for three hours. 20 ml of an saturated aqueous $NaHCO_3$ solution is added to the reaction mixture, then the reaction mixture is extracted with $CH_2Cl_2$. After removal of $CH_2Cl_2$, the residue is added to the potassium salt of the product obtained in ex. 25, which is prepared from 1.98 g (4.57 mmol) of the product obtained in ex. 25 by treatment with 520 mg of tert.-BuOK (4.63 mmol) in 10 ml of DMF at room temperature for 5 min. This mixture is stirred for one day at room temperature. After adding 10 ml of $H_2O$, the reaction mixture is extracted with $CH_2Cl_2$. The extracts are then treated using column chromatography (silica gel, hexane-$Et_2O$ (10:1) mixture as eluent).

TABLE 6 compounds of formula II

| example | $R_9$ | $R_{10}$ | Yield (%) | Colour | Mp. (° C.) |
|---|---|---|---|---|---|
| 24 | 4-phenoxyphenyl | 2-acetylaminoethyl | 12 | yellow | 71.7–75.0 |
| 29 | 4-phenoxyphenyl | 3-bromopropyl | 90 | yellow | 148.1–152.1 |
| 30 | 4-phenoxyphenyl | 1-pyrenylmethyl | 49 | yellow | 203.5–205.8 |

Example 31

A mixture of 5.00 g (20 mmol) of diphenylmaleic anhydride and 2.02 mg (22 mol) of cyclohexylamine are heated to reflux in a mixture of toluene (150 ml) and DMF (150 ml) for five hours. After removal of the solvent mixture in an atmosphere under reduced pressure, 50 ml of methanol are added to solidify the material. The product is collected by filtration, then washed with methanol. Yield: 4.7 g (71%) of a lemon-yellow solid.

Similarly to the above mentioned examples the following compounds are synthesized:

TABLE 7 compounds of formula II

| example | $R_9$ | $R_{10}$ | Yield(%) | Colour | Mp. (° C.) |
|---|---|---|---|---|---|
| 31 | phenyl | cyclohexyl | 71 | lemon-yellow | 159.6–160.3 |
| 32 | phenyl | 2-aminoethyl | 65 | Yellow | >250 |
| 33 | phenyl | isopropyl | 80 | lemon-yellow | 135.3–137.3 |

TABLE 7-continued compounds of formula II

| example | $R_9$ | $R_{10}$ | Yield(%) | Colour | Mp. (° C.) |
|---|---|---|---|---|---|
| 34 | phenyl | 2-aminocyclohexyl | 99 | Yellow | 158.5–160.1 |
| 35 | phenyl | allyl | 62 | Yellow | 89.2–92.0 |
| 36 | 3,4-ethylenedioxy-2-thienyl | cyclohexyl | 78 | Orange | 102.1–104.2 |
| 37 | 4-methoxyphenyl | cyclohexyl | 52 | Yellow | 96.7–100.4 |
| 38 | 1-naphthyl | cyclohexyl | 90 | Yellow | 103.2–108.8 |
| 39 | 4-phenoxyphenyl | cyclohexyl | 92 | Greenish-yellow | 183.9–186.1 |
| 40 | 4-dimethylaminophenyl | cyclohexyl | 79 | Dark red | 229.9–232.0 |
| 41 | 4-phenoxyphenyl | isopropyl | 86 | Yellow | 100.9–102.6 |
| 42 | 4-phenoxyphenyl | tris(hydroxymethyl)methyl | 100 | Yellow | 148.3–150.6 |
| 43 | 4-diphenylaminophenyl | cyclohexyl | 63 | Reddish-orange | 205.2–208.6 |
| 44 | 4-methoxy-1-naphthyl | cyclohexyl | 84 | Yellowish-orange | 151.0–155.2 |
| 45 | 4-acetylaminophenyl | cyclohexyl | 90 | Yellow | 164.5–168.5 |
| 46 | 4-diphenylaminophenyl | isopropyl | 75 | Orange | 212.8–213.6 |
| 47 | 3,4-dimethoxyphenyl | cyclohexyl | 95 | Orange | 135.3–136.9 |
| 48 | 4-phenoxyphenyl | methyl | 80 | Yellow | 134.2–136.4 |
| 49 | 4-phenoxyphenyl | trans-4-aminocyclohexyl | 29 | Yellow | 162.5–165.2 |
| 50 | 4-diphenylaminophenyl | 4-aminocyclohexyl | 60 | Reddish-orange | 245.6–248.5 |

TABLE 8 compounds of formula III

| example | $R_{11}$ | $R_{12}$ | $R_{13}$ | Yield(%) | Colour | Mp. (° C.) |
|---|---|---|---|---|---|---|
| 51 | 4-phenoxyphenyl | 4-dimethylaminophenyl | cyclohexyl | 100 | Red | 80.2–84.1 |
| 52 | 4-phenoxyphenyl | 4-dimethylaminophenyl | stearyl | 90 | Orange | 111.5–113.6 |
| 53 | 4-methoxyphenyl | 9-anthryl | cyclohexyl | 81 | Yellowish-orange | 183.2–186.1 |
| 54 | 3-dibenzofuranyl | 2/3-dibenzofuranyl | isopropyl | 58 | Greenish-yellow | 218.0–222.2 |

TABLE 9 compounds of formula IV ($R_{13} = R_{14} = R_{16} = R_{17}$)

| example | $R_{13}$ | $R_{15}$ | Yield (%) | Colour | Mp (° C.) |
|---|---|---|---|---|---|
| 55 | 4-phenoxyphenyl | trans-1,4-cyclohexylene | 16 | Yellow | >250 | and example 56, yielding a reddish-orange compound of the formula

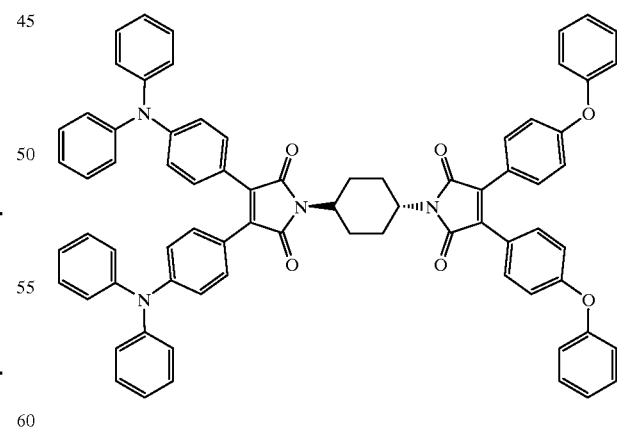

with a yield of 84%, and a melting point of >250° C.

(C) Preparation of N-alkyldiarylmaleimides

General

The corresponding diarylmaleic anhydride (4 mmol) and the corresponding amine (>4 mmol) are heated to reflux in acetic acid (20 ml) for several hours. After removal of the solvents in an atmosphere under reduced pressure, the product is purified by column chromatography (silica gel, CH$_2$Cl$_2$-haxane mixture as eluent).

Example 57

280 mg (1.1 mmol) of diphenylmaleic anhydride are treated with 110 mg of 2,5-di-tert.-butyl-1,4-phenylenediamine (0.51 mmol) in acetic acid (5.0 ml) and heated to reflux for 3 hours. After removal of the solvents in an atmosphere under reduced pressure, the desired product is purified by column chromatography (silica gel, CH$_2$Cl$_2$ as eluent).

Example 58

920 mg of diphenylmaleic anhydride (3.7 mmol) and 260 mg of 1,5-diaminonaphthalene (1.6 mmol) are refluxed in acetic acid (10 ml) for three hours. After removal of the solvents in an atmosphere under reduced pressure, the product is purified by column chromatography (silica gel, CH$_2$Cl$_2$ as eluent).

Example 59

920 mg of diphenylmaleic anhydride (3.7 mmol) and 140 mg of melamine (1.1 mmol) are heated to reflux in acetic acid (10 ml) for 14 hours. The resulting solid is collected by filtration, and the product is purified by column chromatography (silica gel, CH$_2$Cl$_2$-hexane as eluent). Yield: 60%, pale yellow compound, melting point 157.6–162.6° C.

Example 60 similarly a compound of formula II with R$_9$=phenyl and R$_{10}$=3-(hydroxymethyl)phenyl is prepared.

Example 61 similarly a compound of formula II with R$_9$=4-phenoxyphenyl and R$_{10}$=4-amino-2,5-dimethylphenyl is prepared.

Example 62

6.5 g (18 mmol) of the product obtained in ex. 60 are treated with 9.2 g of CBr$_4$ (28 mmol) in the presence of PPh$_3$ (5.8 g, 22 mmol) in 100 ml of CH$_2$Cl$_2$ at room temperature for 10 min. After adding 20 ml of an saturated aqueous NaHCO$_3$ solution, the reaction mixture is extracted with CH$_2$Cl$_2$. The combined extracts are then treated using column chromatography (silica gel, CH$_2$Cl$_2$-hexane mixture as eluent).

Example 63

340 mg (1.0 mmol) of 3,4,9,10-perylenetetracarboxylic dianhydride, 460 g (2.1 mmol) of zinc acetate dihydrate and 1.1 g (1.1 mmol) of the product obtained in ex. 60 are mixed in 4.0 g of imidazole and stirred at 160° C. for 7 hours. Then the reaction mixture is extracted with CH$_2$Cl$_2$ and the combined extracts are treated using column chromatography (silica gel, CH$_2$Cl$_2$-MeOH as eluent).

Example 64

560 mg (1.0 mmol) of the product obtained in ex. 61 are treated with 100 mg of terephthaloyl chloride (0.51 mmol) in the presence of Et$_3$N (0.5 ml) in 10 ml of CH$_2$Cl$_2$ at room temperature for two hours. The resulting solid is filtered and washed first with MeOH, then CH$_2$Cl$_2$, and thereafter with acetone. An insoluble yellow solid is obtained.

TABLE 10 compounds of formula II

| example | R$_9$ | R$_{10}$ | Yield(%) | Colour | Mp. (° C.) |
|---|---|---|---|---|---|
| 60 | phenyl | 3-(hydroxymethyl)phenyl | 99 | Yellow | 141.5–142.3 |
| 61 | 4-phenoxyphenyl | 4-amino-2,5-dimethylphenyl | 76 | Orange | 202.6–204.4 |
| 62 | phenyl | 3-(bromomethyl)phenyl | 60 | Yellow | 157.4–159.6 |

Similarly the following compounds of formula II are prepared:

TABLE 11 compounds of formula II

| ex. | R$_9$ | R$_{10}$ | Yield(%) | Colour | Mp. (° C.) |
|---|---|---|---|---|---|
| 65 | phenyl | phenyl | 75 | Yellow | 170.3–173.7 |
| 66 | phenyl | 2,6-diisopropylphenyl | 94 | Pale greenish-yellow | 217.3–222.9 |
| 67 | phenyl | 4-phenoxyphenyl | 86 | Yellow | 186.9–188.7 |
| 68 | 4-phenoxyphenyl | 2,6-diisopropylphenyl | 90 | Yellow | 202.8–205.2 |
| 69 | 4-diphenylaminophenyl | 2,6-diisopropylphenyl | 63 | Red | 165.0–167.5 |
| 70 | 4-phenoxyphenyl | 2,6-dimethylphenyl | 93 | Yellow | 239.0–240.9 |
| 71 | 4-phenoxypjhenyl | phenyl | 93 | Yellow | 175.6–178.9 |
| 72 | 4-phenoxyphenyl | 2-chloropenyl | 45 | Yellow | 184.0–186.4 |
| 73 | 4-phenoxyphenyl | 2-methylphenyl | 95 | Yellow | 204.4–207.1 |
| 74 | 4-phenoxyphenyl | 2,6-dichlorophenyl | 10 | Yellow | 189.5–191.8 |
| 77 | 4-phenoxyphenyl | 2-amino-4,5-dimethylphenyl | 64 | Orange | 97.6–99.8 |
| 78 | 4-phenoxyphenyl | 2-phenylphenyl | 58 | Pale Yellow | 170.7–173.8 |

TABLE 11-continued compounds of formula II

| ex. | $R_9$ | $R_{10}$ | Yield(%) | Colour | Mp. (° C.) |
|---|---|---|---|---|---|
| 79 | 4-diphenylaminophenyl | 2-methylphenyl | 75 | Reddish-orange | 249.9–252.8 |
| 80 | 4-phenoxyphenyl | 2-phenoxyphenyl | 44 | Yellow | 194.6–196.2 |
| 81 | 4-phenoxyphenyl | 4-aminocarbonylphenyl | 65 | Yellowish-orange | 189.1–190.1 |
| 82 | 4-methoxy-1-naphthyl | 2-phenoxyphenyl | 7 | Red | 140.1–143.3 |
| 83 | 4-diphenylaminophenyl | 2-phenoxyphenyl | 7 | Red | 140.1–143.3 |
| 84 | 3-(N-ethyl)-carbazole | 2,6-dimethylphenyl | 100 | Reddish-orange | >250 |
| 85 | 4-phenylthiophenyl | 2,6-dimethylphenyl | 71 | Orange | 178.6–180.4 |
| 87 | 4-morpholino-phenyl | 2,6-dimethylphenyl | 87 | Reddish-orange | >250 |
| 88 | 4-phenoxyphenyl | 1-pyrenyl | 71 | Yellow | >250 |
| 89 | 2-naphthyl | 2,6-dimethylphenyl | 95 | Yellow | 189.7–190.7 |
| 91 | 1-pyrenyl | 2,6-dimethylphenyl | 100 | Orange | >250 |
| 92 | 4-methoxy-1-naphthyl | 2,6-dimethylphenyl | 100 | Orange | 149.7–151.6 |

TABLE 12 compounds of formula IV ($R_{13}=R_{14}=R_{16}=R_{17}$)

| example | $R_{13}$ | $R_{15}$ | Yield (%) | Colour | Mp. (° C.) |
|---|---|---|---|---|---|
| 57 | phenyl | 2,5-di-tert.-butyl-1,4-phenylene | 70 | greenish-yellow | >250 |
| 58 | phenyl | 1,5-naphthylene | 84 | Pale yellow | >250 |
| 63 | 4-phenoxyphenyl | perylene derivative of formula | 22 | Reddish-orange | >250 |
| 64 | 4-phenoxyphenyl | diamide of formula | 54 | Yellow | >250 |

Similarly the following compounds of formula IV are obtained:

TABLE 13 compounds of formula IV ($R_{13} = R_{14} = R_{16} = R_{17}$)

| example | $R_{13}$ | $R_{15}$ | Yield (%) | Colour | Mp. (° C.) |
|---|---|---|---|---|---|
| 75 | 4-phenoxyphenyl | 2,5-dimethyl-1,4-phenylene | 21 | Yellow | >250 |
| 76 | 4-phenoxyphenyl | 4,5-dimethyl-1,2-phenylene | 8 | Yellow | 166.1–168.7 |
| 90 | 4-phenoxyphenyl | a biradical of the formula | 57 | Yellow | 220.7–221.3 |

TABLE 13-continued compounds of formula IV ($R_{13} = R_{14} = R_{16} = R_{17}$)

| example | $R_{13}$ | $R_{15}$ | Yield (%) | Colour | Mp. (° C.) |
|---|---|---|---|---|---|

[structure: 2-methylphenyl–CH$_2$–CH$_2$–2-methylphenyl]

Similarly the following compounds of formula III are obtained:

TABLE 14 compounds of formula III

| example | $R_{11}$ | $R_{12}$ | $R_{13}$ | Yield (%) | Colour | Mp. (° C.) |
|---|---|---|---|---|---|---|
| 86 | 4-phenoxyphenyl | 4-diphenylamino-phenyl | 2,6-dimethyl-phenyl | 87 | Orange | 231.1–231.9 |
| 93 | 4-chlorophenyl | 4-diphenylamino-phenyl | 2,6-dimethyl-phenyl | 92 | Reddish-orange | 115.7–117.1 |
| 94 | 4-methoxy-1-naphthyl | 4-diphenylamino-phenyl | 2,6-dimethyl-phenyl | 90 | Red | 142.3–144.6 |
| 95 | 4-methoxy-1-naphthyl | 4-phenylthio-phenyl | 2,6-dimethyl-phenyl | 83 | Orange | 99.5–100.6 |

Example 96

7.5 g (30 mmol) of diphenylmaleic anhydride and 750 mg (15 mmol) of hydrazine hydrate are heated to a temperature of 120° C. in o-dichlorobenzene for 16 hours. After the reaction mixture is allowed to cool to room temperature, 100 ml of hexane are added and the obtained precipitate is collected by filtration. After drying, 4.6 g (62%) of a pale yellow solid are obtained. Melting point: >250° C.

Example 97

(a) 20 g (78 mmol) of diphenylmaleic anhydride in acetone (600 ml) are irradiated by 400 W high pressure Hg lamp in the presence of iodine (85 mg, 0.34 mmol) for 21 hours. The resulting pale yellow solid is filtered and washed with acetone. 7.9 g of pale yellow solid 9,10-phenanthrenedicaboxylic anhydride are obtained (41 %). (b) 500 mg (2.0 mmol) of 9,10-phenanthrenedicaboxylic anhydride are treated with 390 mg (2.0 mmol) of 2,6-diisopropylaniline (90%) in 10 ml of acetic acid and heated to reflux for 6 hours. After addition of $H_2O$, the resulting solid is filtered and washed with $H_2O$ and MeOH. The product is purified by column chromatography (silica gel, $CH_2Cl_2$-hexane mixture as eluent). 220 mg of a pale yellow solid are obtained (28%). Melting point: >250° C.

Example 98

3.74 g (15.1 mmol) of 9,10-phenanthrenedicaboxylic anhydride (from ex. 97 (a)) are treated with 3.66 g (30.2 mmol) of 2,6-dimethylaniline in 30 ml of acetic acid and heated to reflux for 30 hours. After addition of $H_2O$, the resulting solid is filtered and washed with $H_2O$ and MeOH. The product is purified by column chromatography (silica gel, $CH_2Cl_2$-hexane mixture as eluent). 3.06 g of a pale yellow solid are obtained (58%). Melting point: 198.7–199.1° C.

Example 99

(a) 1.01 g (4.08 mmol) of 9,10-phenanthrenedicaboxylic anhydride (from ex. 97 (a)) are treated with 6.34 g (82.3 mmol) of ammonium acetate in 12 ml of acetic acid and heated to reflux for 50 hours. After addition of $H_2O$, the resulting solid is filtered and washed first with $H_2O$, then MeOH, and thereafter with $CH_2Cl_2$. The obtained pale yellow solid is treated with 4.56 g (20.9 mmol) of di-tert.-butyl-dicarbonate ("(BOC)$_2$O") in the presence of p-dimethylaminopyridine DMF for one day. After addition of $H_2O$, the resulting solid is filtered and washed with $H_2O$ and then MeOH. 793 mg of N-BOC-9,10-phenanthrenedicaboximide are obtained after purification using column chromatography (silica gel, $CH_2Cl_2$-hexane mixture as eluent).

(b) 403 mg (1.16 mmol) of this N-BOC derivative are treated with 10 ml of 50% $CH_2Cl_2$ solution of trifluoroacetic acid at room temperature for 45 min. The reaction mixture is neutralized with 10 ml of an saturated aqueous $NaHCO_3$ solution and the resulting solid is filtered. Washing with MeOH and $CH_2Cl_2$ afforded the pure desired product. 230 mg of a pale yellow solid are obtained (80% from the N-BOC derivative). Melting point: >250° C.

Example 100

To 30 g (230 mmol) of $AlCl_3$ in $CH_2Cl_2$ (75 ml) are added dropwise to a mixture of 17 g (100 mmol) of 4-phenoxybenzene and 21 g (150 mmol) of ethyl chloroglyoxylate in $CH_2Cl_2$ (75 ml) at ice-bath temperature over one hour. After completion of addition, the mixture is gradually warmed up to room temperature and stirred overnight. Then, the reaction mixture is poured onto ice. The aq. solution is acidified to pH 3 with a HCl aq. solution. Then the reaction mixture is extracted with $CH_2Cl_2$. Thereafter the extract is dried over anhydrous MgSO$_4$. The product is further purified by silica gel column chromatography using CH$_2$Cl$_2$-hexane mixture as eluent. 11 g of a white solid are obtained (31% based on 4-phenoxybenzene in addition to 4-phenoxyphenyl glyoxylic acid ethyl ester (37%). 11 g (29 mmol) of the white solid, a diester, are hydrolyzed with 3.7 g (89 mmol) of NaOH (96%) in 70 ml of H$_2$O and 70 ml of EtOH and heated to reflux for 5 hours. The mixture is acidified to pH 3, and then the product, a diacid, is extracted with CH$_2$Cl$_2$. 9.2 g of an oil are obtained as a crude product. This product is used for the next reaction without further purification. 3.2 g of this oil are treated with 2.5 g (22 mmol) of tert.-BuOK in MeOH to obtain the corresponding potassium salt, and then the solvent is removed by evaporation. After drying in an atmosphere under reduced pressure, the obtained solid is mixed with 3.4 g (21 mmol) of p-methoxyphenylacetic acid in 30 ml of acetic anhydride and heated to reflux for 6 hours. After removal of acetic anhydride by evaporation in an atmosphere under reduced pressure, the product is purified by silica gel column chromatography using CH$_2$Cl$_2$-hexane mixture as eluent. This product is treated with 2 ml (23 mmol) of isopropylamine in toluene-DMF (3:1, 10 ml) for 4 hours. After removal of the solvents under reduced pressure, the product is purified by column chromatography (silica gel, CH$_2$Cl$_2$-haxane mixture as eluent). 69 mg of a yellow solid is obtained (1.0% from the corresponding diacid). Melting point: 86.0–89.1° C.

Example 101

(a) 3,6-Diphenoxy-9,10-phenanthrenedicarboxylic anhydride: 4.9 g (11 mmol) of 3,4-di(4-phenoxyphenyl) maleic anhydride (obtained from ex. 1d) in acetone (600 ml) are irradiated by 400 W high pressure Hg lamp in the presence of iodine (43 mg, 0.17 mmol) for 68 hours. After removal of acetone, the resulting solid is filtered and washed with acetone. The product is purified by column chromatography (silica gel, CH$_2$Cl$_2$-hexane mixture as eluent). 1.4 g of a yellow solid are obtained (30%).

(b) 450 mg (1.0 mmol) of 3,6-diphenoxy-9,10-phenanthrenedicarboxylic anhydride are treated with 260 mg (2.1 mmol) of 2,6-dimethylaniline in 10 ml of acetic acid and heated to reflux for 7 hours. After addition of H$_2$O, the resulting solid is filtered and washed with H$_2$O. The product is purified by column chromatography (silica gel, CH$_2$Cl$_2$-hexane mixture as eluent). 550 mg of a yellow solid are obtained (99%). Melting Point: 223.7–224.5° C.

Example 102

(a) 4-bromomethyl Phenyl Acetic Acid

A mixture of 50 g (0.33 mol) of 4-methylphenyl acetic acid, 62 g (0.35 mol) of N-bromo-succinimide, 200 ml of carbon tetrachloride and 0.1 g of 2,2-azobis(isobutyronitrile) are placed in a 500 ml flask and heated to reflux with stirring for 4 hours. After the reaction mixture is cooled to room temperature, it is poured into 500 ml of water. The obtained precipitate is filtered off, and then washed with water. After drying under an atmosphere of reduced pressure, 55 g of a white powder are obtained (72%).

(b) Phosphonium Salt

A mixture of 11.45 g (0.05 mol) of 4-bromomethyl phenyl acetic acid, 13.1 g (0.05 mol) of triphenyl phosphine and 500 ml of toluene is refluxed for 2 hours. The reaction mixture is cooled down to room temperature, and the thus obtained precipitates are collected by filtration and subsequently washed with hot hexane. After drying, 21.86 g of a phosphonium salt are obtained (89%).

(c) 4-stilbene Acetic Acid

At room temperature, 4.91 g (0.01 mol) of the above obtained phosphonium salt, 1.17 g (0.011 mol) of benzaldehyde, 211 mg (0.8 mmol) 18-crown-6 and 1.68 g (0.03 mol) of KOH are added to 40 ml of dichloromethane and stirred for 18 hours. After being acidified with 1 M HCl, the dichloromethane is separate off and removed off in atmosphere under reduced pressure. The product is purified by column chromatography (silica gel, CH$_2$Cl$_2$-methanol mixture as eluent). After drying, 4-stilbene acetic acid is obtained quantitatively.

(d) 3.17 g (10 mmol) of triphenylamino glyoxylic acid is placed in a flask containing 1.3 g (11.6 mmol) of tert.-BuOK and 30 ml of methanol. The mixture is heated up to reflux for 1 hour. Then the methanol is removed to give the corresponding triphenylglyoxylic acid potassium salt quantitatively. To the obtained triphenylglyoxylic acid potassium salt 2.38 g (10 mmol) of 4-stilbene acetic acid and 30 ml of acetic anhydride are added and heated up to 130° C. for 2 hours. After the reaction mixture is cooled to room temperature, acetic anhydride is removed in an atmosphere under reduced pressure and the product is purified by column chromatography (silica gel, CH$_2$Cl$_2$-hexane mixture as eluent). 2.3 g of the corresponding red solid maleic anhydride are obtained (44%).

(e) A mixture of 2.08 g (4 mmol) of this maleic anhydride, 2.12 g (12 mmol) of 2,6-diisopropylaniline and 25 ml of acetic acid is heated up to 150° C. for 12 hours. After the acetic acid is removed in an atmosphere under reduced pressure, the product is purified by column chromatography (silica gel, CH$_2$Cl$_2$-hexane mixture as eluent). 2.45 g of a red solid maleimide of formula XI

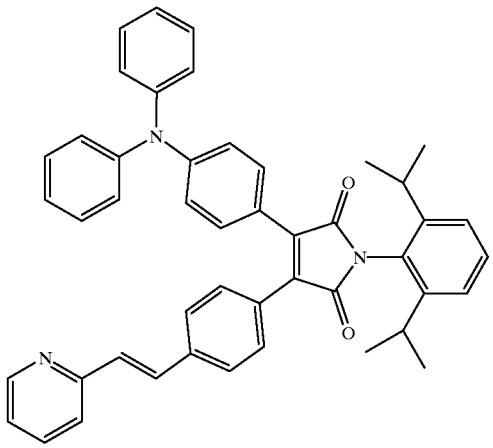

XI are obtained (90%).

Example 103

Example 102 is repeated except that 2-pyridinecarboxyaldehyde is used at the stage of the Wittig reaction and a red solid compound of formula XII

XII

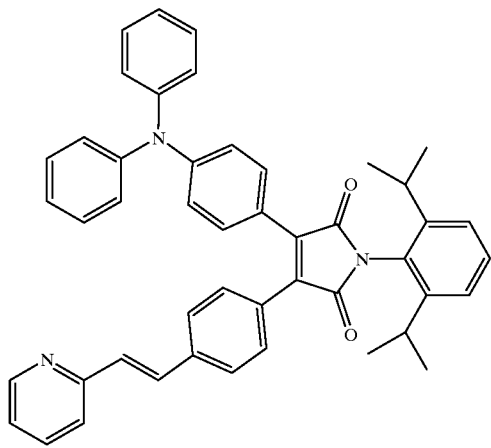

is obtained.

Example 104

Example 102 is repeated except that 2-thiophenecarboxyaldehyde is used at the stage of the Wittig reaction and a red solid compound of formula XIII

XIII

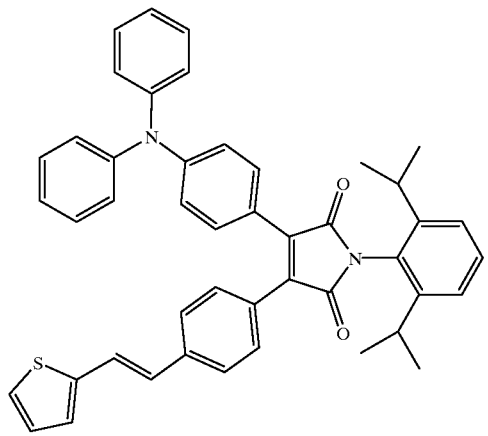

is obtained.

Example 105

Example 102 is repeated except that p-tolylaldehyde is used at the stage of the Wittig reaction and a red solid compound of formula XIV

XIV

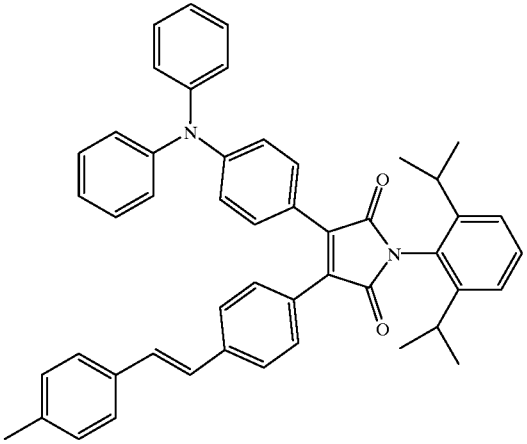

is obtained.

Example 106

Example 102 is repeated except that 4-chlorobenzdehyde is used at the stage of the Wittig reaction and a red solid compound of formula XV

XV

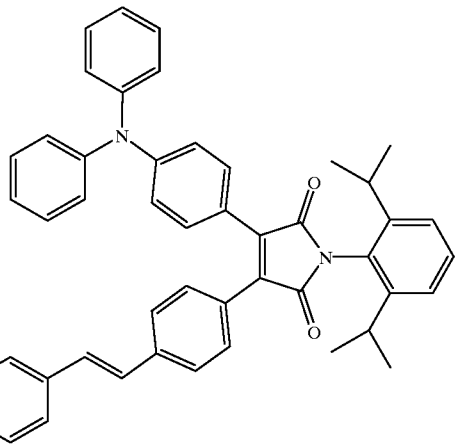

is obtained.

Example 107

Example 102 is repeated except that 4-phenoxyphenylglyoxylic acid is used for the preparation of maleic anhydride to give a yellow fluorescent solid compound of formula XVI

XVI

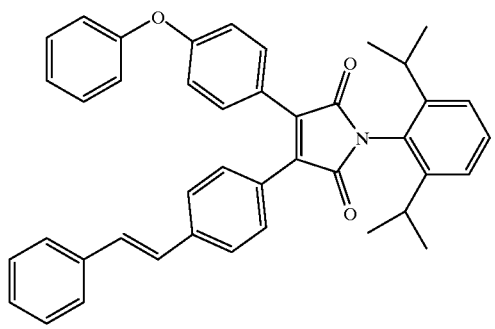

Example 108

Example 102 is repeated except that 4-cyanobenzaldehyde is used at the stage of the Wittig reaction and a red solid compound of formula XVII

XVII

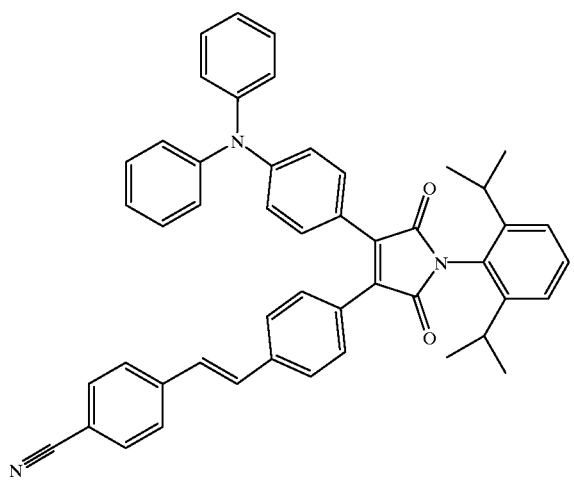

is obtained.

Example 109

Example 102 is repeated except that 4-methoxybenzaldehyde is used at the stage of the Wittig reaction and a red solid compound of formula XVIII

XVIII

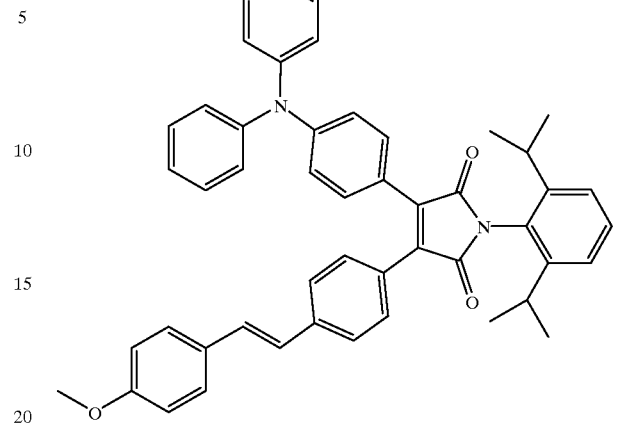

is obtained.

Example 110

A mixture of 5 g (20 mmol) of diphenylmaleic anhydride and 1.14 g (10 mmol) of 1,4-diaminocyclohexane are heated to reflux in a mixture of 150 ml toluene and 50 ml of DMF for eight hours. After removal of the solvent mixture in an atmosphere under reduced pressure, the obtained crude solid is washed twice with each 100 ml of acetone. After drying, 2.26 g (39%) of a lemon yellow solid is obtained.

Example 111

Photostability Testing of the Compounds in High-impact Polystyrene (HIPS)

1. Preparation of samples for the photostability testing:

1.1 Formulation comprising of the following components is prepared:

| | |
|---|---|
| HIPS (FINA 825 from FINA Oil and chemical Co,; melt flow index is 8.0 on ASTM D-1238) | 99.9 wt- % |
| compound | 0.1 wt- % |

1.2 Dry tumbling is carried out for the above formulation for 15 min.

1.3 HIPS plates are prepared with an injection-molding machine at 220° C. The dwell time is 3 min.

1.4 The plates are exposed to a Xenon-lamp using Fade-O-meter (Model WEL-15X-HC-B.EC, Suga Co. ltd.) under the following condition:

| | |
|---|---|
| • Xe-lamp power | 0.35 W/m$^2$ at 340 nm |
| • Black panel temperature | 63° C. |
| • Humidity (relative) | 50% |
| • Mode | no-rain |

1.5 Photostability after 100-hour exposure is evaluated in terms of photoluminescence intensity and color change ($\Delta E_{ab}$ and blue scale).

2 Results

The results are summarized in the table below.

Plates prepared from maleimides obtained in ex. 39 and ex. 79 are found to retain strong photoluminescence intensities, even after 100-hour weathering test. The above compounds display color change ($\Delta E_{ab}$), corresponding to the results of Gray Scale evaluation (the maximum scale is "5").

TABLE 15

Results of photostability tests

| plates ob-<br>tained with<br>compounds<br>of example: | Color | Before<br>exposure<br>Photolumi-<br>nescence<br>intensity | After 100-hour exposure | | |
|---|---|---|---|---|---|
| | | | Photolu-<br>mines-<br>cence<br>intensity | $\Delta E_{ab}$ | Gray<br>scale |
| 39 | greenish yellow | 928.6 | 721.1 | 5.21 | 5 |
| 24 | yellow | 876.2 | 450.1 | 11.90 | |
| 73 | yellow | 668.0 | 484.9 | 5.18 | |
| 79 | reddish orange | 504.7 | 483.7 | 0.50 | 5 |
| 46 | orange | 548.4 | 525.7 | 1.55 | |
| 44 | yellowish orange | 485.9 | 364.8 | 2.43 | |
| 27 | orange | 432.4 | 391.3 | 3.59 | |
| 82 | orange | 372.2 | 345.8 | 2.22 | |
| 36 | orange | 879.2 | 657.1 | 11.43 | |
| 37 | yellow | 973.4 | 684.7 | 7.53 | |
| 38 | yellow | 154.9 | 126.0 | 1.92 | |
| 45 | yellow | 940.3 | 685.0 | 6.53 | |
| 47 | orange | 682.0 | 561.3 | 4.88 | |
| 84 | reddish orange | 718.6 | 673.0 | 1.70 | |
| 85 | orange | 981.1 | 803.3 | 4.10 | |

1.2 The above formulation is applied to a disperser (LAU GmbH, model BA-S 20 K) for two hours to achieve a homogeneous dispersion of the pigment.

1.3 The dispersion obtained is applied on a transparent polyester substarte film using a blade to give ca. 100 μm thick of the painted layer.

1.4 The film is exposed to a Xe-lamp using a Fade-Ometer (Model WEL-15-X-HC-B.EC, Suga Co.Ltd.) under the following condition:

| | |
|---|---|
| • Xe-lamp power | 0.35 W/m² at 340 nm |
| • black panel temperature | 63° C. |
| • humidity (relative) | 50% |
| • mode | no-rain |

1.5 Photostability after 100-hour exposure is evaluated in terms of photoluminescence intensity and color change ($\Delta E_{ab}$ and blue scale).

2 Results

The results are summarized in the Table below

The following compounds show photoluminescence intensities stronger than the commercial products, i.e. Radiant, even after 100-hour weathering test: ex. 39, 41, 25, 24, 70, 72, 73, 74, 80, and 45.

TABLE 16

Results of photostability tests in NC-ink formulation

| plates ob-<br>tained with<br>compounds<br>of example: | Color | Before<br>exposure<br>Photolumi-<br>nescence<br>intensity | After 100-hour exposure | | |
|---|---|---|---|---|---|
| | | | Photolu-<br>mines-<br>cence<br>intensity | $\Delta E_{ab}$ | Blue<br>scale |
| 39 | greenish yellow | 3203 | 2609 | 8.21 | 5–6 |
| 41 | yellow | 2358 | 1413 | 5.39 | 4–5 |
| 25 | yellow | 2441 | 1673 | 2.57 | 5–6 |
| 24 | yellow | 1973 | 968 | 11.18 | 5–6 |
| 70 | yellow | 2748 | 2287 | 4.05 | <6 |
| 72 | yellow | 2914 | 1860 | 5.18 | 5–6 |
| 73 | yellow | 2681 | 2122 | 4.67 | 5 |
| 74 | yellow | 3041 | 2147 | 4.46 | 6 |
| 80 | yellow | 1663 | 1632 | 0.73 | 6 |
| 45 | yellow | 1673 | 1109 | 5.47 | 6 |
| Radiant Y. | | 2093 | 115 | 28.98 | <3 |
| Radiant R. | | 1640 | 116 | 25.44 | <3 |
| Radiant O. | | 1267 | 32 | 25.07 | <3 |

Example 113

Photostability Testing of the Compounds in Linseed Oil Ink Formulation

1. Preparation of the ink formulation:

1.1 Formulation comprising of the following components is prepared:

linseed oil: 75.0 wt.-%
compound: 25.0 wt.-%

1.2 The above formulation is applied to an Automatic Hoover Muller (from Toyo Seiki Co.) for three minutes to achieve a homogeneous dispersion of the pigment.

1.3 The dispersion obtained is applied on a white paper substrate using a blade to give a 100 μm thick painted layer.

1.4 The film is exposed to a Xe-lamp using a Fade-Ometer (Model WEL-15-X-HC-B.EC, Suga Co.Ltd.) under the following condition:

| | |
|---|---|
| • Xe-lamp power | 0.35 W/m² at 340 nm |
| • black panel temperature | 63° C. |
| • humidity (relative) | 50% |
| • mode | no-rain |

1.5 Photostability after 100-hour exposure is evaluated in terms of photoluminescence intensity and color change ($\Delta E_{ab}$ and blue scale).

2 Results

The results are summarized in the Table below.

The following compounds show photoluminescence intensities stronger than the commercial products, i.e. Radiant, even after 100-hour weathering test: compounds from ex. 39, 41, 25, 70, and 80. In addition, these compounds display a color change $\Delta E_{ab}$ superior to the state of the art compounds.

TABLE 17

Results of photostability tests in linseed oil ink formulation

| plates obtained with compounds of example: | Color | Before exposure Photoluminescence intensity | After 100-hour exposure Photoluminescence intensity | $\Delta E_{ab}$ | Blue scale |
|---|---|---|---|---|---|
| 39 | greenish yellow | 4124 | 3971 | 2.35 | 6 |
| 41 | yellow | 3209 | 3511 | 3.16 | 6 |
| 25 | yellow | 3421 | 2680 | 2.44 | 6 |
| 70 | yellow | 3624 | 3181 | 3.48 | 6 |
| 80 | yellow | 2225 | 1889 | 1.59 | 6 |
| Radiant Y. | | 5217 | 1616 | 56.79 | <3 |
| Radiant R. | | 3227 | 2159 | 40.46 | <3 |
| Radiant O. | | 4386 | 1237 | 45.90 | <3 |

TABLE 18

Results of photostability tests in PMMA

| plates obtained with compounds of example: | color | Before exposure Photoluminescence intensity | After 100-hour exposure Photoluminescence intensity | $\Delta E_{ab}$ | Gray scale |
|---|---|---|---|---|---|
| 39 | greenish yellow | 752 | 607 | 6.75 | 4–5 |
| 70 | yellow | 698 | 523 | 7.66 | 4–5 |
| 80 | yellow | 400 | 286 | 6.14 | 4–5 |
| 79 | reddish orange | 331 | 319 | 0.53 | 5 |
| 46 | orange | 393 | 371 | 0.73 | 5 |
| Radiant Y. | | | | | 3–4 |
| Radiant R. | | | | | 2 |
| Radiant O. | | | | | 1–2 |

Example 114

Photostability Testing of the Compounds in PMMA

1. Preparation of samples for the photostability testing:

1.1 Formulation comprising of the following components is prepared:

PMMA (Sumiplex LG from Sumitomo Chemical Co.; melt flow index is 10 g/10 min on JIS-K7210): 99.9 wt.-%
compound: 0.1 wt.-%

1.2 Dry tumbling is carried out for the above formulation for 15 minutes.

1.3 PMMA plates are prepared with an injection-molding machine at 220° C. The dwell time is three minutes.

1.4 The plate is exposed to a Xe-lamp using a Fade-Ometer (Model WEL-15-X-HC-B.EC, Suga Co.Ltd.) under the following condition:

| | |
|---|---|
| • Xe-lamp power | 0.35 W/m² at 340 nm |
| • black panel temperature | 63° C. |
| • humidity (relative) | 50% |
| • mode | no-rain |

1.5 Photostability after 100-hour exposure is evaluated in terms of photoluminescence intensity and color change ($\Delta E_{ab}$ and blue scale).

2 Results

The results are summarized in the Table below. Compounds of ex. 39, 70, 80, 79, and 46 are found to retain strong photoluminescence intensity, even after 100-hour weathering test. The above mentioned compounds exhibit a small color change ($\Delta E_{ab}$), corresponding to the results of a Gray Scale evaluation (maximum scale="5"). The comparative examples from Radiant are evaluated only using a Gray Scale, indicating that the results are inferior to the inventive compounds.

Example 115

On an ITO glass substrate (made by Geomatech Co. Ltd., ITO film thickness 200 nm, sheet resistance 10 Ω/cm²), a diamine represented by the following formula

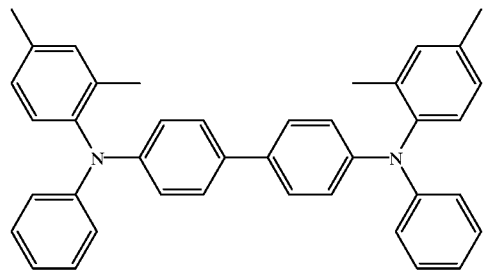

is deposited as a hole transporting substance by vacuum evaporation under a vacuum of $6.65 \times 10^{-4}$ Pa ($5.0 \times 10^{-6}$ Torr) and at a depositing rate of 0.05 nm/sec to a membrane thickness of 50 nm.

Then, on the hole transporting layer thus prepared, the product obtained in ex. 37 is deposited under a depositing condition of $6.65 \times 10^{-4}$ Pa ($5.0 \times 10^{-6}$ Torr) and 0.05 nm/sec to a membrane thickness of 50 nm to form a light-emitting layer.

Then, on this light-emitting layer, firstly lithium is doped with the above compound at a rate of 0.015 nm/s to form a 1 nm-thick layer and subsequently aluminum as cathode are deposited on it to a film thickness of 200 nm.

By using the ITO side as the anode and the magnesium side as the cathode, a bias of 20 V is applied to the above element. A luminescence showing a luminance of 248 cd/m² (using Luminometer LS-110 manufactured by Minolta Co, Ltd) is obtained as the average value of the five elements.

Examples 116–125

Example 115 is repeated, except the following light-emitting compounds are employed. The results are summarized in Table 19 below together with the results of Example 115.

TABLE 19

| Example | Light-emitting compound obtained from example: | λ$_{EL}$ (nm) | Luminance (cd/m$^2$) |
|---|---|---|---|
| 115 | 37 | 556 | 248 |
| 116 | 22 | 514 | 60 |
| 117 | 38 | 552 | 126 |
| 118 | 25 | 553 | 14 |
| 119 | 69 | 628 | 152 |
| 120 | 70 | 551 | 150 |
| 121 | 79 | 633 | 81 |
| 122 | 80 | 554 | 120 |
| 123 | 46 | 618 | 233 |
| 124 | 55 | 554 | 61 |
| 125 | 102 | 641 | 350 |

Example 126

Void Detection

A waterborne primer based on acrylic latex is prepared according to the following formulation:

| | Composition | wt.- % |
|---|---|---|
| 1) | Demineralized water | 3.10 |
| 2) | Methylcarbitol[a] | 5.00 |
| 3) | Orotan 165[b] | 0.82 |
| 4) | Triton CF 10[c] | 0.29 |
| 5) | Drew Plus TS 4380[d] | 0.28 |
| 6) | Acrysol RM 8[e] | 0.60 |
| 7) | Bayferrox 130 M[f] | 5.72 |
| 8) | Millicarb[g] | 17.40 |
| 9) | fluorescent agent | |
| 10) | Butyldigykol | 3.67 |
| 11) | Maincote HG-54[h] (41.5% supply form) | 58.70 |
| 12) | Texanol[i] | 1.50 |
| 13) | Di-butylphthalate[k] | 1.50 |
| 14) | Sodium nitrite[l] (13.8% in dem. water) | 0.80 |
| 15) | Drew T 4310[m] | 0.32 |
| 16) | ammonia(25%) | 0.30 |
| | Total | 100.0 | solids: 47%; pH: 8–8.5
wherein:
[a]Methylcarbitol: di-ethylene-glykolmonomethylether (from Union Carbide);
[b]Orotan 165: dispersing agent (Rohm and Haas Company);
[c]Triton CF 10: non - ionic wetting agent (Rohm and Haas Comp.);
[d]Drew Plus TS 4380: defoamer (Drew Chem. Corp.)
[e]Acrysol RM 8: non - ionic thickener (Rohm and Haas Comp.);
[f]Bayferrox 130 M: red iron oxide pigment (Bayer AG);
[g]Millicarb: calcium carbonate (Omya);
[h]Maincote HG-54: acrylic dispersion (Rohm and Haas Comp.);
[i]Texanol. coalescent (Eastman Chem. Prod., Inc.);
[k]Di - butylphthalate: plastisizer (Eastman Chem. Prod., Inc.);
[l]sodium nitrite flash rust inhibitor (Fluka);
[m]Drew T 4310: non - ionic defoamer (Drew Chem. Corp.)

wherein:
a) Methylcarbitol: di-ethylene-glykolmonomethylether (from Union Carbide); b) Orotan 165: dispersing agent (Rohm and Haas Company); c) Triton CF 10: non-ionic wetting agent (Rohm and Haas Comp.); d) Drew Plus TS 4380: defoamer (Drew Chem. Corp.) e) Acrysol RM 8: non-ionic thickener (Rohm and Haas Comp.); f) Bayferrox 130 M: red iron oxide pigment (Bayer AG); g) Millicarb: calcium carbonate (Omya); h) Maincote HG-54: acrylic dispersion (Rohm and Haas Comp.); i) Texanol. coalescent (Eastman Chem. Prod., Inc.); k) Di-butylphthalate: plastisizer (Eastman Chem. Prod., Inc.); l) sodium nitrite: flash rust inhibitor (Fluka); m) Drew T 4310: non-ionic defoamer (Drew Chem. Corp.)

As fluorescent agents the following maleimides (component 9) obtained from examples 35, 98, 28, 22, 33, 31, 96, as well as a mixture of 1,2,3,4-tetraphenyl-benzo[4,5]imidazo[2,1-a]isoindol-11-one-7 and -8 (obtained according to example 1 of WO 98/33862 are used.

The components 1 to 8 or 1 to 9 respectively are dispersed at 3000 rpm to a particle size of <15 μm using a high-speed disperser. The compounds 1 or 1a of the present invention are thereby incorporated in a range chosen from 0.1 to 1% by weight, based on the total solids of the formulation containing no fluorescent agent (solids content=47% by weight). According to this, a concentration of 1% b.w. translates to 0.47 g per 100 g paint. The formulation is completed under reduced speed (100 rpm) by adding the components 10 to 16 in the given order. Prior to application the pH of the formulation is adjusted to pH 8–8.5 using a ammonium hydroxide solution (25%).

The formulations are sprayed onto aluminum panels at a dry film thickness in the range of from 50 to 55 μm. Once the formulations are cured the coatings are inspected under an UV-lamp. Defects or voids as a result of misapplication or artificially applied defects can be easily detected, as the compounds of the present invention show intense fluorescence only at the voids. No fluorescence is observed in the absence of the fluorescent agents.

Example 127

A solvent based white pigmented 2 pack epoxy primer is prepared according to the following formulation:

| | Composition | parts by wt. |
|---|---|---|
| 1) | Araldit GZ 7071[a] (75% in xylene) | 24.2 |
| 2) | Aerosil R 972[b] | 0.5 |
| 3) | Thixatrol ST[c] | 0.2 |
| 4) | Kronos RN 56[d] | 25.0 |
| 5) | Bayferrox 318M[e] | 0.1 |
| 6) | Micr. Talk AT Extra[f] | 15.8 |
| 7) | Blanc Fixe[g] | 14.2 |
| 8) | Cyclohexanone | 8.3 |
| 9) | Xylene | 11.7 |
| 10) | n-Butanol | 10.0 |
| 11) | fluorescent agent Subtotal | 110.0 |
| 12) | Hardener HY 815[h] (50% in xylene) | 18.2 |
| | Total | 128.2 | solids (wt.- %): 64.8 wherein:
a) Araldit GZ 7071: epoxy resin (Ciba Specialty Chemicals, Inc.); b) Aerosil R 972: synthetic silica, thickener (Degussa AG); c) Thixatrol ST: anti-settling agent, thixotropic agent (Kronos Titan GmbH); d) Kronos RN 56: titanium dioxide (Kronos Titan GmbH); e) Bayferrox 318 M: iron oxide black (Bayer AG); f) Talc AT Extra (Norwegian); g) Blanc Fixe: barium sulphate (Sachtleben); h) Hardener HY 815: polyamido amine (Ciba Specialty Chemicals, Inc.)

As fluorescent agents the following maleimides (component 11) obtained from examples 35, 98, 28, 22, 33, 31, 96, as well as a mixture of 1,2,3,4-tetraphenyl-benzo[4,5]imidazo[2,1-a]isoindol-11-one-7 and -8 (obtained according to example 1 of WO 98/33862 are used.

The components 1 to 10 or 1 to 11 respectively are dispersed on a ball mill or equivalent to a particle size <15 μm. The compounds of the present invention are thereby incorporated in a range of from 0.1 to 1% b.w. The amounts are based on the total solids of the formulation containing no fluorescent agent (solids=64.8% b.w.). According to this an amount of 1% b.w. corresponds to 0.64 g per 128.2 g paint. Prior to application the hardener (component 12) is added. For spray application the viscosity is adjusted using xylene as a solvent.

The formulations are sprayed onto aluminium panels at a dry film thickness of 70 μm. Once the formulations are cured the coatings are inspected under a UV-lamp. Defects or voids as a result of misapplication or artificially applied defects can be easily detected, as the compounds of the present invention show intense fluorescence at the voids. No fluorescence is observed in the absence of the fluorescent agents.

Example 128

A 2 pack epoxy primer according to example 127 is prepared thereby replacing component 4 (Kronos RN 56) by iron oxide red (Bayferrox 318 M). The resulting red/brownish formulation is made and evaluated as described in example 127.

Example 129

The inventive maleimides according to formula I are incorporated in a concentration of 0.5% to 1% (based on the total solids of the formulation containing no fluorescent agent; solids content=19%) into a commercial automotive cathodic electrocoat.

During electrodeposition the bath temperature is kept at 28° C. whilst stirring. The electrocoat is deposited onto steel panels at 250 Volts for 2 minutes. After application the panels are rinsed with demineralized water and subsequently baked at 180° C. for 25 minutes. The resulting film thickness is 25 μm. Once the formulations are cured, the coatings are inspected under a UV-lamp. Defects or voids as a result of misapplication or artificially applied defects can be easily detected, as the compounds of the present invention show intense fluorescence at the voids. No fluorescence is observed in the absence of the fluorescent agents.

Example 130

Example 115 is repeated replacing the light-emitting material and the cathode with the film co-deposited using tris-(8-hydroxyquinolinato)aluminum(III) (manufactured by Wako Pure Chemicals Industries, Ltd.) and the compound of formula XI (ca. 4.0 wt %) and the cathode co-deposited using magnesium and silver (Mg:Ag, 20:1), respectively. The co-deposition is done under a depositing condition of $6.665 \times 10^{-4}$ Pa ($5.0 \times 10^{-6}$ Torr) and 320 pm/s (3.2 Å/s) for the aluminum complex, 13 pm/s (0.13 Å/s) for the compound of formula XI, 200 pm/s (2.0 Å/s) for magnesium and 10 pm/s (0.1 Å/s) for silver. For comparison, the device employing the compound of the complex for light-emitting substance is prepared using the cathode of Mg:Ag (20:1).

The device the light-emitting layer of which comprises of solely the aluminum complex indicates green EL emission. The emission maximum is at 520 nm in wavelength. The device the light-emitting layer of which comprises of the complex and the compound of formula XI exhibits EL emission whose maximum wavelength is at 620 nm, i.e. an orange red emission which is different from that of the single component device above. This suggests that the emission is induced via resonance energy transfer from the aluminum complex to the compound invented.

The above results demonstrate that the invented compounds are useful for energy acceptor of Host-Guest type of light-emitting materials.

Example 131

(a) 5.5 g (0.02 mol) of 4-trans-stilbene glyoxylic acid is placed in a flask containing 2.46 g (22 mmol) of tert.-BuOK and 30 ml of methanol. The mixture is heated up to reflux for 30 min. Then the methanol is removed to give the corresponding 4-trans-stilbene glyoxylic acid potassium salt. To the obtained potassium salt 4.76 g (20 mmol) of 4-trans-stilbene acetic acid and 30 ml of acetic anhydride are added and heated up to 130° C. for 2 hours. After cooling to room temperature, acetic anhydride is removed from the mixture and the product is purified by column chromatography (silica gel, $CH_2Cl_2$/hexane). 6.5 g (62%) of the corresponding maleic anhydride are obtained.

(b) A mixture of 4.55 g (10 mmol) of the thus obtained maleic anhydride, 7.1 g (30 mmol) of 2,6-diisopropylaniline and 50 ml of acetic acid is heated up to 130° C. form eight hours. After the acetic acid is removed under an atmosphere of reduced pressure, the product is purified by column chromatography (silica gel, $CH_2Cl_2$/hexane). 5.03 g (82%) of an orange-red maleimide of the formula XIX are obtained

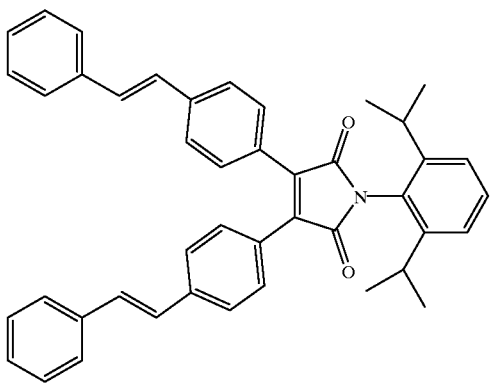

XIX

Example 132

Example 131 is repeated except that cyclohexylamine is used instead of 2,6-diisopropylaniline. An orange solid (72%) of the formula XX is obtained

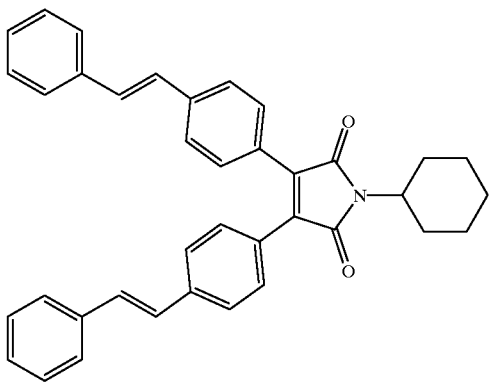

XX

Example 133

Example 102 is repeated except that cyclohexylamine is used instead of 2,6-diisopropylaniline. A red solid (68%) of the formula XXI is obtained

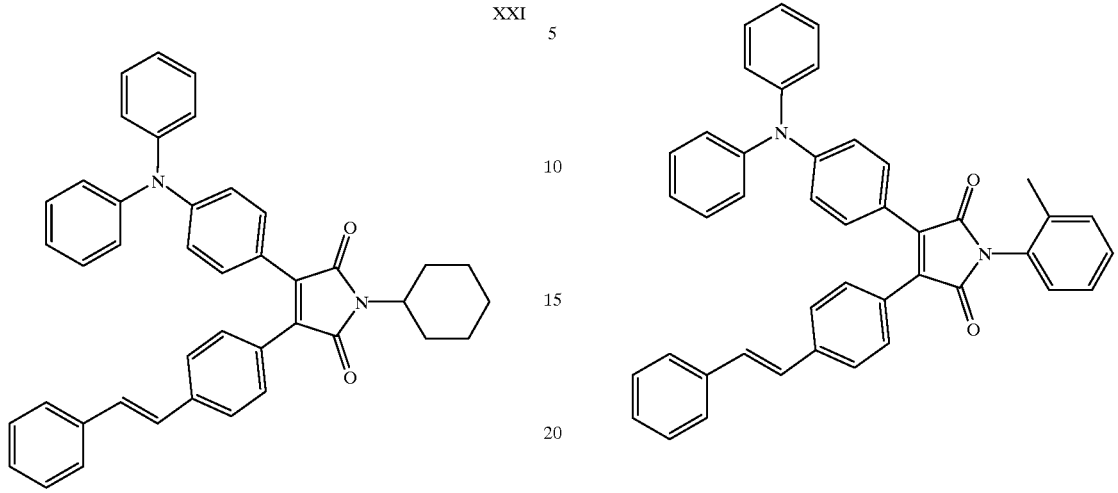

Example 134

Example 102 is repeated except that isopropylamine is used instead of 2,6-diisopropylaniline. A red solid (73%) of the formula XXII is obtained

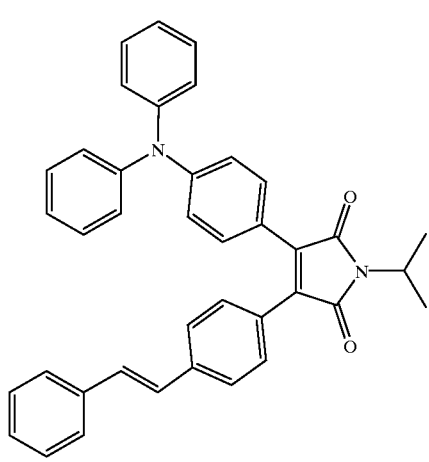

Example 135

Example 102 is repeated except that o-toluidine is used instead of 2,6-diisopropylaniline. A red solid (76%) of the formula XXIII is obtained Example 136

Example 102 is repeated except that ethyleneamine is used instead of 2,6-diisopropylaniline. A red solid (54%) of the formula XXIV is obtained

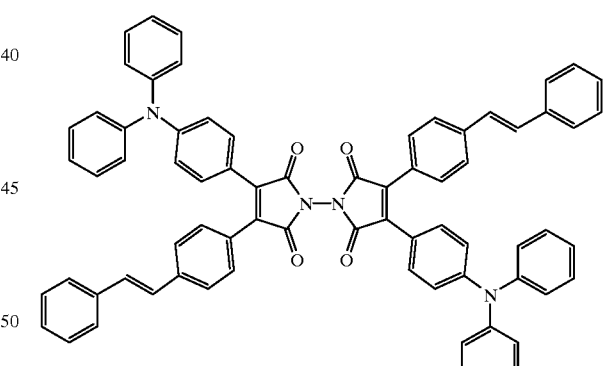

Example 137

Example 102 is repeated except that 1,4-diaminocyclohexane is used instead of 2,6-diisopropylaniline. A red solid (58%) of the formula XXV is obtained

XXV

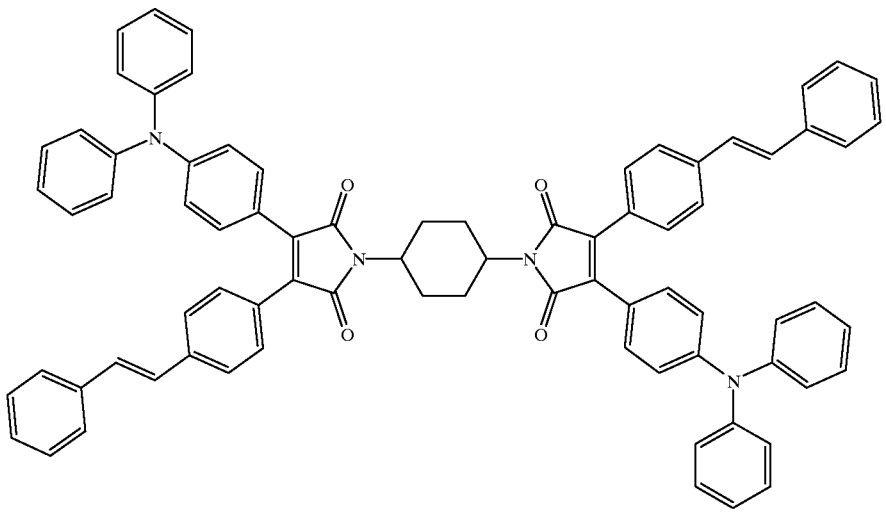

Example 138

5.35 g (20 mmol) of 9-ethylcarbazole-3-glyoxylic acid is placed in a flask containing 2.46 g (22 mmol) of tert.-BuOK and 25 ml of methanol. The mixture is heated up to reflux for 30 min. Then the methanol is removed to give the corresponding 4-trans-stilbene glyoxylic acid potassium salt. To the obtained potassium salt 4.76 g (20 mmol) of 4-trans-stilbene acetic acid and 30 ml of acetic anhydride are added and heated up to 130° C. for 2 hours. After cooling to room temperature, acetic anhydride is removed from the mixture and the product is purified by column chromatography (silica gel, $CH_2Cl_2$/hexane). 7.1 g (73%) of the corresponding maleic anhydride are obtained.

(b) A mixture of 4.83 g (10 mmol) of the thus obtained maleic anhydride, 7.1 g (30 mmol) of 2,6-diisopropylaniline and 50 ml of acetic acid is heated up to 130° C. form eight hours. After the acetic acid is removed under an atmosphere of reduced pressure, the product is purified by column chromatography (silica gel, $CH_2Cl_2$/hexane). 5.01 g (78%) of an orange-red maleimide of the formula XXVI are obtained

XXVI

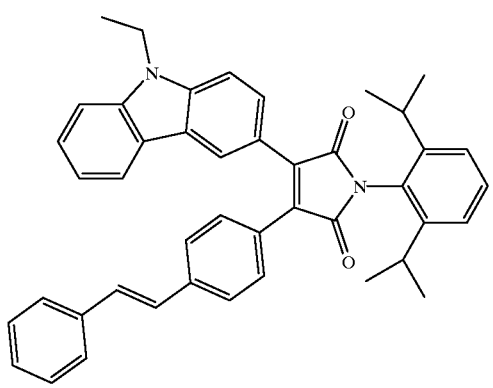

Example 139

(a) To 24.6 g (0.18 mol) of $AlCl_3$ in 200 ml of $CH_2Cl_2$ a mixture of 30 g (0.12 mol) of 9-phenyl carbazole and 17.75 g (0.13 mol) of ethyl chloroglyoxylate in 100 ml of $CH_2Cl_2$ is added dropwise at ice-bath temperature over 1 h. After completion of addition, the mixture is gradually allowed to room temperature and stirred over night. Then, the reaction mixture is poured onto ice. The aqueous solution is acidified to pH 3 with aq. HCl, and the product is extracted with $CH_2Cl_2$ afterwards. The extract is dried over anhydrous $MgSO_4$. The desired product is purified by Silica gel column chromatography using $CH_2Cl_2$-hexane mixture as eluent. 24.5 g of ethyl 3-(9-phenylcarbazole)glyoxylate are obtained (58%).

(b) 24.5 g (0.07 mol) of ethyl 3-(9-phenylcarbazole) glyoxylate are treated with 3.6 g (0.09 mol) of NaOH in 75 ml of $H_2O$ and 75 ml of ethanol under reflux for 2 h. The mixture is acidified to pH 3 with aq. HCl, and then extracted with $CH_2Cl_2$. After drying, 17.0 g of 3-(9-phenylcarbazole) glyoxylic acid are obtained as a crude product (74%). This product is used for the next reaction step without further purification (c) 3.15 g (0.01 mol) of 3-(9-phenylcarbazole)glyoxylic acid are placed in a flask containing 1.23 g (0.011 mol) of tert.-BuOK and 30 ml of methanol. The mixture is heated up to reflux for 30 min. Then the methanol is removed to give 3-(9-phenylcarbazole)glyoxylic acid potassium salt. To the obtained potassium salt, 2.37 g (0.01 mol) of 4-trans-stilbene acetic acid and 30 ml of acetic anhydride are added and heat up to 130° C. for 4 hours. After the reaction mixture is allowed to cool to room temperature, acetic anhydride is removed and the product is purified by column chromatography (silica gel, $CH_2Cl_2$-hexane mixture). 1.1 g (22%) of the corresponding maleic anhydride are obtained.

(d) 1.1 g (2.1 mmol) of this maleic anhydride, 0.63 g (6.3 mmol) of cyclohexylamine, 10 ml of N,N-dimethylformamide and 30 ml of toluene are heated up to 130° C. for 6 hours. After the used solvents are removed under an atmosphere of reduced pressure, the product is purified by column chromatography (silica gel, $CH_2Cl_2$-hexane mixture). 0.91 g (72%) of an orange-red maleimide XXVII are obtained

XXVII

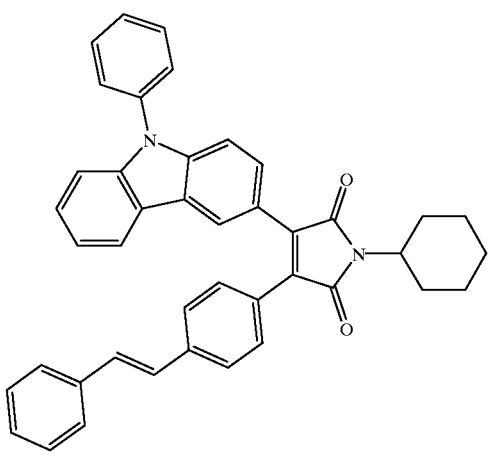

Example 140

Example 115 is repeated, except the following light emitting compounds are employed. The results are summarized in the Table 20.

TABLE 20

| Example | Light-Emitting Material (Example) | EL Emission Peak wavelength (nm) | EL Intensity (cd/m$^2$) |
|---|---|---|---|
| 140 | 131 | 589 | 230 |
| 141 | 132 | 582 | 243 |
| 142 | 133 | 637 | 400 |
| 143 | 134 | 659 | 82 |
| 145 | 136 | 656 | 94 |
| 146 | 137 | 655 | 164 |
| 147 | 138 | 618 | 430 |
| 148 | 139 | 610 | 320 |

Example 149

Example 115 is repeated for EL device preparation using as light emitting material compound XIX (ex. 131) as an energy donor and Lumogen®Red 300 (BASF) as an energy acceptor. Table 21 below shows the results.

Examples 150–151

Example 149 is repeated, except the following light energy donors are employed (see Table 21). The results are summarized in Table 21.

TABLE 21

| Example | Host material (example) | Guest/Lumogen ® Red 300 concentration [wt.- %] | EL Emission Peak wavelength [nm] | EL Intensity [cd/m$^2$] |
|---|---|---|---|---|
| 149 | 107 | 1 | 609 | 522 |
| 150 | 131 | 2 | 612 | 478 |
| 151 | 132 | 1.8 | 614 | 548 |

What is claimed is:
1. A compound of formula I

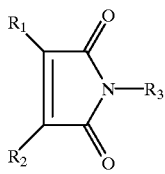

wherein $R_1$ and $R_2$ independently from each other stand for

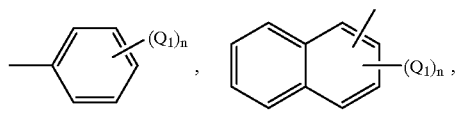

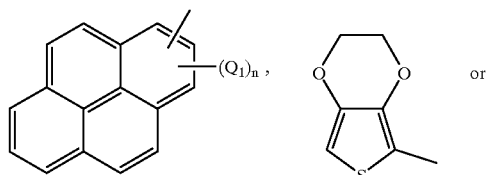

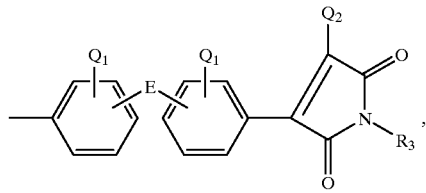

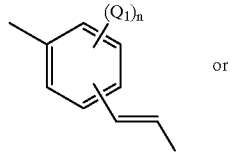

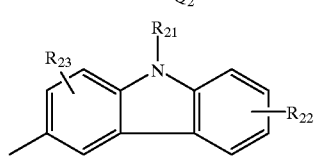

wherein $Q_1$ stands for hydrogen, halogen, phenyl, —E—$C_1$–$C_8$alkyl, —E-phenyl, wherein phenyl can be substituted up to three times with $C_1$–$C_8$alkyl, halogen, $C_1$–$C_8$alkoxy, diphenylamino, —CH=CH—$Q_2$, wherein $Q_2$ stands for phenyl, pyridyl, or thiophenyl, which can be substituted up to three times for $C_1$–$C_8$alkyl, halogen, $C_1$–$C_8$alkoxy, —CN, wherein E stands for oxygen or sulfur, and wherein $R_{21}$ stands for $C_1$–$C_8$alkyl, phenyl, which can be substituted up to three times with $C_1$–$C_4$alkyl, $C_1$–$C_4$alkoxy, or dimethylamino, and $R_{22}$ and $R_{23}$ independently from each other stand for hydrogen, $R_{21}$, $C_1$–$C_8$alkoxy, dimethylamino,
or —NR$_4$R$_5$, wherein R$_4$ and R$_5$, independently from each other stand for hydrogen, phenyl, or $C_1$–$C_8$alkyl-carbonyl, or —NR$_4$R$_5$ stands for five- or six-membered ring system, and $R_3$ stands for allyl,

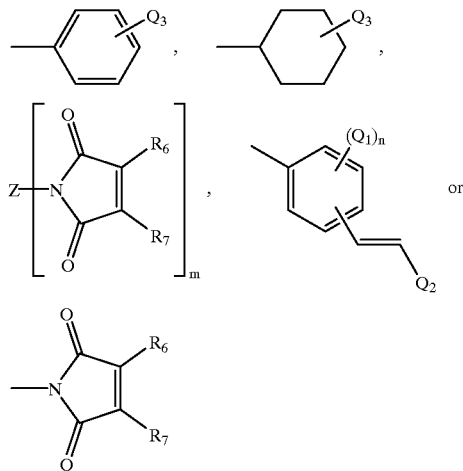

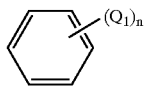

n stands for 1, 2 or 3, and m stands for 1 or 2, with the proviso, that $R_1$ and $R_2$ not simultaneously stand for phenyl.

2. Process for the preparation of maleimides of the formula I according to claim 1 by reacting a maleic anhydride with an amine, which comprises using as maleic anhydride the diarylmaleic anhydride of the formula V

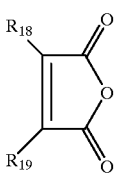

wherein $Q_3$ stands for hydrogen, halogen, $C_1$–$C_8$alkoxy, or $C_1$–$C_8$alkyl-phenylamido, unsubstituted or phenyl substituted $C_1$–$C_8$alkyl, unsubstituted or substituted up to three times with halogen, —$NH_2$, —OH, or $C_1$–$C_8$alkyl, and Z stands for a di- or trivalent radical selected from the group consisting of substituted or unsubstituted cyclohexylene, triazin-2,4,6-triyl, $C_1$–$C_6$ alkylene, 1,5-naphthylene, wherein $R_{18}$ and $R_{19}$, independently from each other stand for $R_1$ or $R_2$ as defined in claim 1, and as amine the amine $H_2N$—$R_3$ or the diamine $H_2N$—Z—$NH_2$, wherein $R_3$ and Z are defined in claim 1.

3. A process for the preparation of maleimides I as set forth in claim 1, which comprises reacting in a first step the diarylmaleic anhydride V as set forth in claim 2 with ammonium acetate, then—in a second step—reacting the thus obtained intermediate Vb

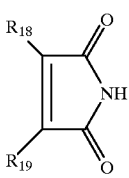

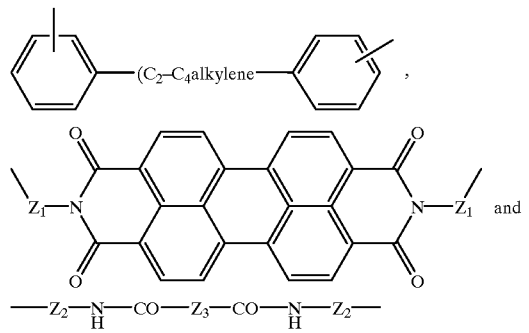

wherein $Z_1$, $Z_2$ and $Z_3$, independently from each other stand for cyclohexylene or up to three times with $C_1$–$C_4$alkyl substituted or unsubstituted phenylene, and wherein $R_6$ and $R_7$, independently from each other, stand for with a base, and in a third step reacting the obtained anion with a halogen compound X—$R_3$ or X—Z—X, wherein $R_3$ and Z are defined as set forth in claim 1, and X stands for halogen.

* * * * *